(12) United States Patent
Krishnan et al.

(10) Patent No.: US 11,720,074 B2
(45) Date of Patent: Aug. 8, 2023

(54) METHOD AND SYSTEM FOR MANAGING VIRTUAL CONTROLLERS IN A BUILDING MANAGEMENT SYSTEM

(71) Applicant: HONEYWELL INTERNATIONAL INC., Charlotte, NC (US)

(72) Inventors: Ravi Bharathi Krishnan, Bangalore (IN); Suresh Vemuri, Bangalore (IN); Vivek Ramachandran, Bangalore (IN); Ramprasad Yelchuru, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 52 days.

(21) Appl. No.: 17/323,432

(22) Filed: May 18, 2021

(65) Prior Publication Data

US 2021/0382451 A1    Dec. 9, 2021

(30) Foreign Application Priority Data

Jun. 6, 2020   (IN) .............................. 202011023797

(51) Int. Cl.
*G05B 19/042*   (2006.01)

(52) U.S. Cl.
CPC ............... *G05B 19/0426* (2013.01); *G05B 2219/23276* (2013.01); *G05B 2219/25011* (2013.01)

(58) Field of Classification Search
CPC ...... G05B 19/0426; G05B 2219/23276; G05B 2219/25011; G05B 15/02;

(Continued)

(56) References Cited

U.S. PATENT DOCUMENTS

| 8,429,630 B2 | 4/2013 | Nickolov et al. |
| 2009/0141795 A1* | 6/2009 | Horie .................. H04N 19/126 375/240.03 |

(Continued)

FOREIGN PATENT DOCUMENTS

| CN | 101655689 A | 2/2010 |
| KR | 20180117399 A | 10/2018 |

(Continued)

OTHER PUBLICATIONS

Petri Ion et al, "Edge-Cloud Orchestration: Strategies for Service Placement and Enactment," 2019 IEEE International Conference on Cloud Engineering (IC2E), IEEE, Jun. 24, 2019, XP033593227 (9 pgs).

(Continued)

*Primary Examiner* — Mohammad Ali
*Assistant Examiner* — Sheela Rao
(74) *Attorney, Agent, or Firm* — Seager, Tufte & Wickhem, LLP

(57) ABSTRACT

A control system for controlling operation of a plurality of building control devices includes a pool of virtual controllers that are hosted on one or more computing device and are configured to provide control commands for controlling one or more associate building control devices of the plurality of building control devices. Each of a plurality of edge controllers are associated with at least one building control device and are configured to receive and execute control commands from one or more of the virtual controllers to control the associated one or more building control devices. An orchestrator is configured to monitor one or more operational characteristics of each of the virtual controllers and to modify one or more aspects of the pool of virtual controllers when one or more of the operational character- (Continued)

istics of one or more of the virtual controllers meets predetermined characteristics.

15 Claims, 26 Drawing Sheets

(58) Field of Classification Search
CPC ...... G05B 2219/2642; G05B 19/41835; G05B 19/0421
See application file for complete search history.

(56) References Cited

U.S. PATENT DOCUMENTS

| | | |
|---|---|---|
| 2017/0212487 A1* | 7/2017 | Gupta ..................... F24F 11/62 |
| 2017/0284691 A1 | 10/2017 | Sinha et al. |
| 2019/0158309 A1 | 5/2019 | Park et al. |
| 2022/0206445 A1* | 6/2022 | Reichl .................... H04L 12/66 |
| 2022/0206448 A1* | 6/2022 | Zhang ................. G05B 19/042 |

FOREIGN PATENT DOCUMENTS

| | | |
|---|---|---|
| WO | 9960487 A1 | 11/1999 |
| WO | 2015051528 A1 | 4/2015 |

OTHER PUBLICATIONS

European Extended Search Report, EP Application No. 21174514.6, dated Nov. 8, 2021 (10 pgs).
IN Office Action, IN Application No. 202011023797, dated Dec. 15, 2021 (6 pages).

\* cited by examiner

FIG. 25

METHOD AND SYSTEM FOR MANAGING VIRTUAL CONTROLLERS IN A BUILDING MANAGEMENT SYSTEM

CROSS-REFERENCE TO RELATED APPLICATIONS

This application claims priority pursuant to 35 U.S.C. 119(a) of India Patent Application No. 202011023797, filed Jun. 6, 2020, which application is incorporated herein by reference in its entirety.

TECHNICAL FIELD

The present disclosure relates generally to building management systems. More particularly, the present disclosure relates to building management systems with distributed control.

BACKGROUND

Building management systems may be used to control operations of a variety of different building management system components. These may include Heating, Ventilation and/or Air Conditioning (HVAC) components, security system components, lighting system components, and/or any other type of building system component, depending on the application. In many cases, a building management system includes an on-site centralized supervisory controller that is networked to a number of on-site device controllers that each control one or more building control devices. Such conventional building management systems can suffer from some significant disadvantages. For example, keeping up with the rapidly evolving building requirements for comfort, energy, security and/or safety often requires upgrades to the underlying hardware and/or firmware used for the on-site centralized supervisory controller and/or the device controllers. Upgrading the hardware and software for these devices on a regular basis to realize the additional benefits of new technologies and/or additional value add services can require significant investment by the building operator. What often occurs is that the upgrades to the legacy system are not performed until business justification on return on investment is met or until the upgrades become inevitable to remain competitive. Moreover, with conventional building management systems, if modifications to the building are made, such as partitioning the building to accommodate a new tenant, a technician must typically visit the site, add and/or re-position/reprogram some device controllers, and re-program the centralized supervisory controller. This can be a tedious, time-consuming and expensive process. What would be desirable is a building management system that can more cost effectively adapt to changes in building requirements.

SUMMARY

The present disclosure relates generally to methods and systems for managing virtual controllers in a building management system. In one example, a control system for controlling operation of a plurality of building control devices includes a pool of virtual controllers that are hosted on one or more computing device and a plurality of edge controllers. Each of the virtual controllers in the pool of virtual controllers are configured to provide control commands for controlling one or more associate building control devices of the plurality of building control devices. Each of the plurality of edge controllers are associated with at least one building control device and are configured to receive and execute control commands from one or more of the plurality of virtual controllers of the pool of virtual controllers to control the associated one or more building control devices. An orchestrator is configured to monitor one or more operational characteristics of each of the plurality of virtual controllers in the pool of virtual controllers and to modify one or more aspects of the pool of virtual controllers when one or more of the operational characteristics of one or more of the plurality of virtual controllers meets predetermined characteristics.

In another example, a method of controlling operation of a building control device that is located at a building site uses a virtual controller that is hosted on a server that is remote from the building site. An edge controller is provided that is configured to control the building control device and that is capable of communicating with the virtual controller. Control commands are sent from the virtual controller to the edge controller to control the building control device. One or more operational characteristics of the virtual controller are monitored and are modified when one or more of the operational characteristics meets one or more predetermined characteristics.

In another example, a control system for controlling operation of a plurality of building control devices includes a pool of virtual controllers that are hosted on one or more computing devices, each of the virtual controllers in the pool of virtual controllers are configured to provide control commands for controlling one or more associate building control devices of the plurality of building control devices. The control system includes a plurality of edge controllers, each of the plurality of edge controllers being associated with at least one building control device and being configured to receive and execute control commands from one or more of the plurality of virtual controllers of the pool of virtual controllers to control the associated one or more building control devices. An orchestrator is configured to monitor one or more operational characteristics of each of the plurality of virtual controllers in the pool of virtual controllers. The orchestrator is further configured to automatically replace a virtual controller in the pool of virtual controllers with a new virtual controller and mapping one or more of the plurality of edge controllers that were associated with the replaced virtual controller to the new virtual controller when one or more of the operational characteristics of the replaced virtual controller meets one or more predetermined characteristics.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 25 is a flow diagram showing execution of a simulation engine within a programming tool.

Figure 1:
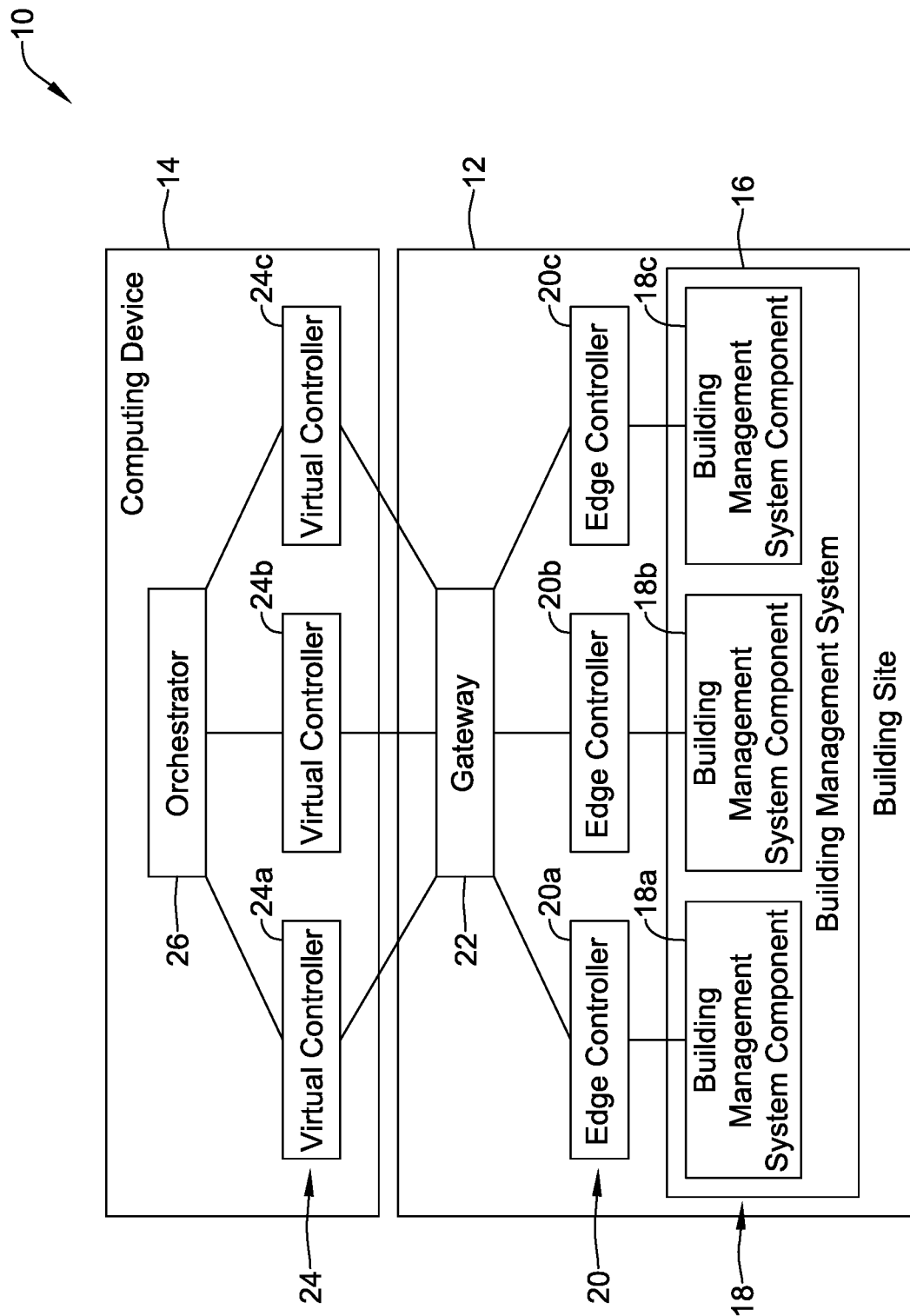
FIG. 1 is a schematic block diagram of an illustrative building management system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building management system 10. In its broadest terms, the illustrative management building system 10 includes a building site 12 and a computing device 14. The computing device 14 may be a cloud-based server, for example. The computing device 14 may be remote from the building site 12, although this is not required in all cases. The building site 12 may generally represent any building or portion of a building. The building site 12 includes a building management system 16. The building management system 16 may represent a Heating, Ventilating and Air Conditioning (HVAC) system, a security system, and/or a lighting system, for example. In any event, the illustrative building management system 16 includes a number of building management system components 18 that are individually labeled as 18a, 18b, 18c. While a total of three building management system components 18 are shown, it will be appreciated that this is merely illustrative, as the building management system 16 may include any number of building management system components 18. If the building management system 16 represents an HVAC system, the building management system components 18 may represent individual components within an HVAC system, such as heating sources, cooling sources, ventilation sources, VAV (Variable Air Volume) boxes, air dampers and the like, for example. If the building management system 16 represents a security system, the building management system components 18 may represent such as security sensors, control pads and the like. If the building management system 16 represents a lighting system, then some of the building management system components 18 may represent individual components of a lighting system, such as individual lighting sources. These are just examples.

The illustrative building site 12 includes a number of edge controllers 20 that are individually labeled as 20a, 20b, 20c. The edge controllers 20 may be used, for example, to control operation of the building management system components 18 within the building management system 16. While a total of three edge controllers 20 are shown, it will be appreciated that this is merely illustrative, as the building site 12 may include any number of edge controllers 20. In an HVAC system, for example, a particular edge controller 20 could control operation of a VAV box that is represented by one of the building management system components 18. The edge controller 20 for that particular building management system component 18 may control the relative damper position within the VAV box in order to achieve a desired air flow, or perhaps to achieve a desired temperature set point, within a corresponding portion of the building site 12. While shown as having a one-to-one relationship between an individual building management system component 18 and a corresponding individual edge controller 20, this is not necessarily true in all cases. For example, in some cases, a single edge controller 20 could control operation of two or more different building management system components 18.

In some cases, each of the edge controllers 20 may be operably coupled with a gateway 22. Each of the edge controllers 20 may be coupled with the gateway 22 via wired or wireless connections. Each of the edge controllers 20 may, therefore, communicate with the computing device 14 by communicating through the gateway 22. In some cases, the gateway 22 may not be present, and each of the individual edge controllers 20 may communicate directly with the computing device 14. The edge controllers 20 and the gateway 22, if present, may communicate with each other via a network protocol, such as BACNET, MODBUS, LONTALK, ENOCEAN, ZIGBEE, X10 and/or any other suitable network protocol.

In the example shown, the computing device 14 includes a number of virtual controllers 24 that are individually labeled as 24a, 24b, 24c. While a total of three virtual controllers 24 are shown, it will be appreciated that this is merely illustrative, as the computing device 14 may include any number of virtual controllers 24. In some cases, the virtual controllers 24 may be considered as being hosted by the computing device 14. While the virtual controllers 24 are shown as communicating with the gateway 22, in some cases it is contemplated that at least some of the virtual controllers 24 may communicate directly with at least some of the edge controllers 20, and vice versa.

Because the virtual controllers 24 are virtual, rather than being traditional application specific hardware-based controllers, and because the virtual controllers 24 are hosted on the computing device 14, it is possible to share resources of the computing device 14 between the virtual controllers 24. In some cases, the system resources of the computing device 14 assigned to a particular virtual controller 24 may be increased or decreased on-the-fly in response to the work load and other performance parameters that may be measured for each of the virtual controllers 24. In some cases, the computing device 14 may include an orchestrator 26 that monitors the performance of each of the virtual controllers 24. The orchestrator 26 may be considered as being hosted by the computing device 14, but this is not required.

As will be discussed in greater detail, the orchestrator 26 may be configured to make changes to individual virtual controllers 24 in response to detected workloads and/or other performance parameters. For example, if the orchestrator 26 determines that the current work load being handled by a particular virtual controller 24, such as the virtual controller 24a, rises above a threshold work load, the orchestrator 26 may be configured to add system resources such as memory, storage space or even processor capacity, to the virtual controller 24a. In some cases, the orchestrator 26 may be configured to move tasks between individual virtual controllers 24 in order to balance work load and other performance parameters if a one virtual controller 24 is overloaded and another has a light work load. The orchestrator 26 may be configured to spawn one or more new virtual controllers 24 to accommodate excess workload if and when the need arises. In some cases, the orchestrator 26 may spawn a new virtual controller 24, update the new virtual controller with a new firmware or software update, and then map the building control devices previously mapped to an existing virtual controller 24 to the new virtual controller 24. The existing virtual controller 24 may then be removed. Without this approach, the existing virtual controller 24 may need to be taken off-line to download and/or install the updates.

Figure 2:
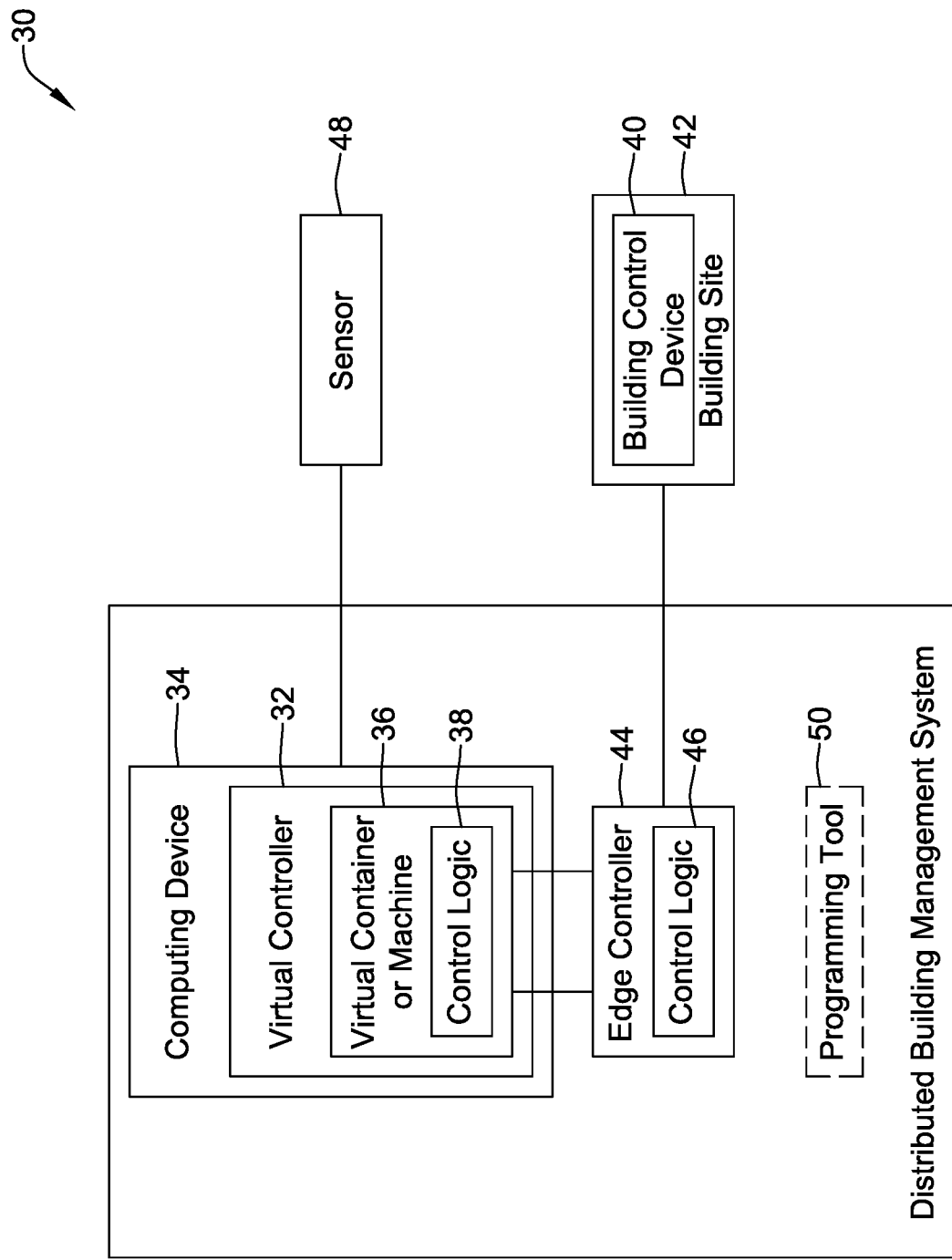
FIG. 2 is a schematic block diagram of an illustrative distributed building management system.

FIG. 2 is a schematic block diagram of an illustrative distributed building management system 30 for controlling a building control device 40 at a building site 42. In some cases, the illustrative distributed building management system 30 may be considered as a smaller example of the building system 10 shown in FIG. 1. The illustrative distributed building management 30 includes a virtual controller 32 that is hosted on a computing device 34. The virtual controller 32 may be considered as being an example of the virtual controllers 24 while the computing device 34 may be considered as being an example of the computing device 14 of FIG. 1. In some cases, the virtual controller 32 has assigned resources including assigned memory resources and assigned processing resources, wherein at least one of the assigned memory resource and assigned processing resources are adjustable via a software setting (e.g. via the orchestrator 26). The virtual controller 32 includes a virtual container or a virtual machine 36 that includes control logic 38. The control logic 38 generates control commands for controlling the building control device 40 at the building site 42. The building control device 40 may, for example, be considered as an example of one of the building management system components 18 referenced in FIG. 1.

The illustrative distributed building management system 30 includes an edge controller 44 that is associated with the building control device 40. In some cases, the edge controller 44 may be an IO controller that is operatively coupled with the building control device 40. In some cases, the edge controller 44 may be part of the building control device 40. The edge controller 44 may be in operative communication with the virtual controller 32 via one or more networks.

The edge controller 44 may be considered a smart edge controller and may include control logic 46 that is configured to at least selectively provide closed loop control of one or more functions of the building control device 40. The edge controller 44 is in operative communication with the virtual controller 32 and is configured to receive and execute control commands generated by the virtual controller 32. In some cases, the control logic 46 of the edge controller 44 may be configured to monitor for a communication failure and/or communication latency with the virtual controller 32, and when a communication failure and/or communication latency is detected, the control logic 46 of the edge controller 44 may be configured to provide closed loop control of one or more functions of the building control device 40. As an example, one of the functions of the building control device 40 may be a fail-safe mode. In some cases, the fail-safe mode may maintain certain critical controls, such as control to a default heating setpoint to avoid freezing pipes and the like, enforce control limits, implement controls that are based on user interaction (e.g. a manual fan override, a manual bypass push button. etc.), interlocks (e.g. electrical heater can never be 'on' without associated fan 'on' but fan alone can be 'on', PID enable can never be 'on' without associated fan 'on'), alarms (e.g. fan fail alarm, damper fail alarm. etc.), safety (e.g. frost, over heat protection, fire. Etc.). These are just examples. Thus, if communication with the virtual controller 32 fails or is delayed, the smart edge controller may maintain the critical control functions of the building control device. In some cases, the smart edge controller may maintain an inner control loop that controls at least some of the critical control functions even when communication with the virtual controller 32 is operating properly, and the virtual controller may provide a supervisory or outer control loop by providing control commands to the edge controller. For example, the virtual controller 32 may provide a new setpoint (perhaps on a schedule) to the edge controller via the outer control loop, and the edge controller may control the building control device to the commanded set point via the inner control loop. This is just an example.

In some cases, one or more sensors 48 may be operably coupled with the virtual controller 32, although only one sensor 48 is shown. The virtual controller 32 may be configured to receive one or more sensed values sensed by one or more sensors 48 of the distributed building management system 30. In some cases, the virtual controller 32 may receive one or more of the sensed values directly from a sensor, from an edge controller operatively coupled to a sensor, from another virtual controller that itself received one or more of the sensed values, and/or in any other suitable manner. The control logic 38 of the virtual controller 32 may use the one or more sensed values in determining the control commands. When the virtual controller 32 determines that one or more sensed values are not properly received, the control logic 38 of the virtual controller 32 may be configured to use one or more fail-safe sensed values in determining the control commands. For example, a fail-safe sensed value may include a default sensed value or a last known sensed value.

The virtual controller 32 may receive one or more parameters from other virtual controllers (such as the virtual controllers 24), and the control logic 38 of the virtual controller 32 may utilize the one or more parameters in determining the control commands Such parameters may include, for example, a current status of another building control device. When the virtual controller 32 determines that one or more parameters were not properly received, the control logic 38 of the virtual controller 32 may be configured to use one or more fail-safe parameter values in determining the control commands.

The distributed building management system 30 may include a programming tool 50. The programming tool 50 may be configured to assign two or more control logic functions of the distributed building management system 30 to either the virtual controller 32 or the edge controller 44. For example, the programming tool 50 may be used to assign one or more control logic functions to the edge controller 44 that are not suitable to implement with the control logic 38 of the virtual controller 32 because of possibly latency delays in receiving corresponding control commands from the virtual controller 32.

Figure 3:
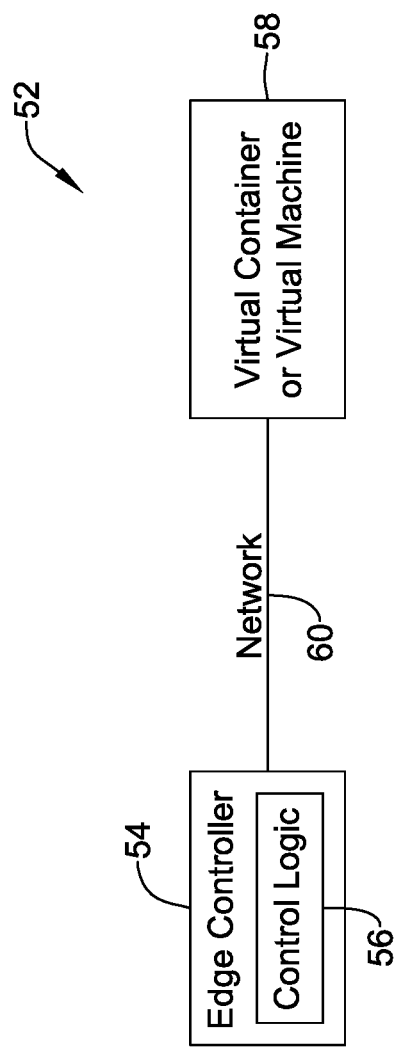
FIG. 3 is a schematic block diagram of an illustrative system including a virtual container or a virtual machine connected to an edge controller.

FIG. 3 is a schematic block diagram of an illustrative system 52 that includes a virtual container or a virtual machine 58 and an edge controller 54. The edge controller 54 may be considered as being an example of one of the edge controllers 20 shown in FIG. 1 or the edge controller 44 shown in FIG. 2. The edge controller 54 may be considered as being configured to control a building control device such as the building control device 40 (or one of the building management system components 18). The edge controller 54 may be considered as including control logic 56 that is configured to at least selectively provide closed loop control of one or more functions of a building control device. The edge controller 54 may be configured to be in operative communication with a virtual container or a virtual machine 58 over a network 60, sometimes via a gateway 22 or the like. The edge controller 54 is configured to receive and execute control commands that are generated by the virtual container or the virtual machine 58. In some cases, the control logic 56 may be configured to monitor for a communication failure and/or communication latency with the virtual container or the virtual machine 58, and when a communication failure and/or communication latency is detected, the control logic 56 of the edge controller 54 may be configured to provide closed loop control of one or more functions of a building control device.

Figure 4:
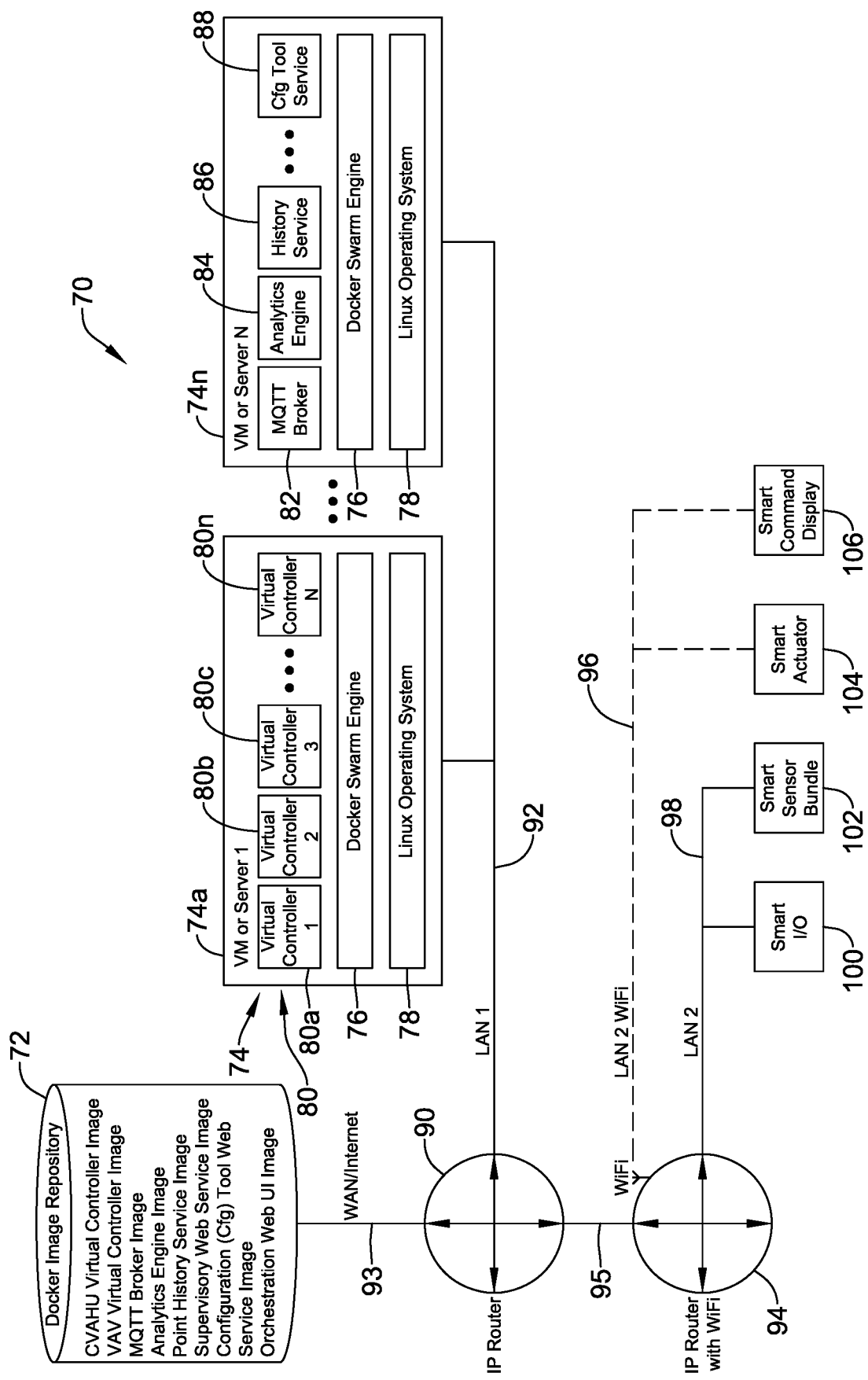
FIG. 4 is a schematic block diagram of an illustrative system.

In some cases, a virtual environment that includes virtual controllers may be implemented using the Docker environment. The Docker environment host one or more virtual containers, which are each a piece of code intended to provide specific functionality, run within the operating system of the computing device. FIG. 4 is a schematic block diagram of a system 70 showing how a Docker environment may be used in implementing a virtual environment including one or more virtual controllers. The system 70 includes a Docker Image Repository 72 that includes a number of different images that may be useful when creating a desired virtual environment using Docker. The system 70 includes a number of virtual machines or servers 74, labeled as 74*a* through 74*n*. Each of the virtual machines or servers 74 include a Docker Swarm Engine 76 running within a Linux operating system 78. As illustrated, the virtual machine or server 74*a* includes a number of virtual containers 80, individually labeled as 80*a*, 80*b*, 80*c* through 80*n*. The virtual machine or server 74*n* is shown as including other elements, such as but not limited to an MQTT broker 82, an Analytics Engine 84, a History Service block 86 and a Tool Service block 88.

An IP router 90 generates a Local Area Network (LAN1) labeled as 92. The LAN1 labeled as 92 permits communication with at least some of the virtual machines or servers 74, as well as permitting communication with the Docker Image Repository 72 over a Wide Area Network (WAN) 93. The Internet is an example of a WAN such as the WAN 93. An IP Router with WiFi 94 generates a WiFi network 96, a LAN3 labeled as 95, which permits communication between the IP router 90 and the IP Router with WiFi 94, and a LAN2 labeled as 98. The system 70 also includes a Smart I/O device 100, a Smart Sensor Bundle 102, a Smart Actuator 104 and a Smart Command Display 106, as examples of possible edge controllers/building control devices. It will be appreciated that multiple LANs are illustrated in order to show that each component may exist on a different routable network. In some cases, all of the components may be on a single LAN, or on fewer or more networks.

Figure 5:
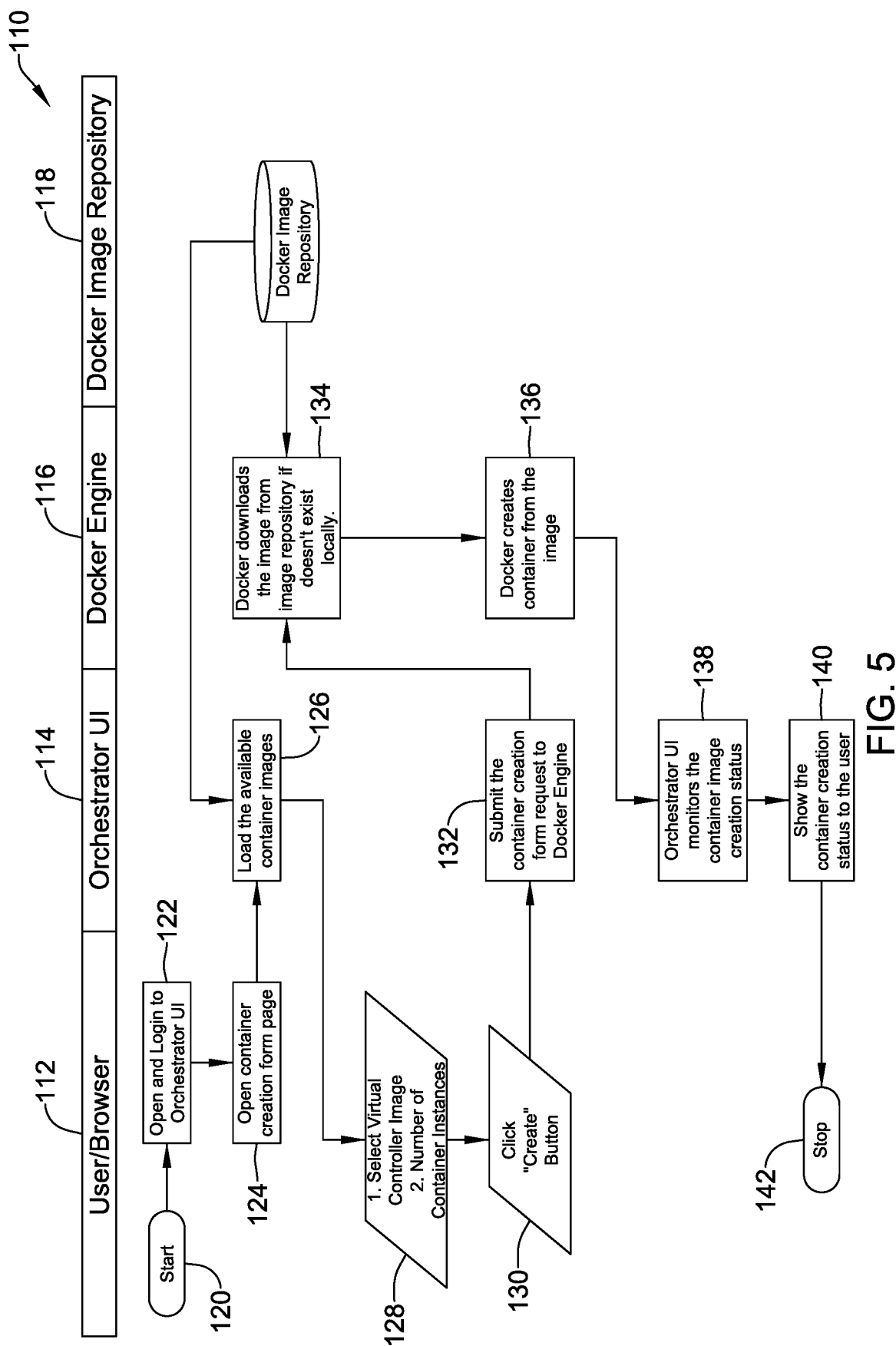
FIG. 5 is a flow diagram showing an illustrative method of adding a new virtual controller.

As noted, in some cases, the orchestrator 26 may be able to spawn a new virtual controller in the virtual environment using Docker. FIG. 5 is a flow diagram showing an illustrative method 110 of adding a new virtual controller. It will be appreciated that the illustrative method 110 may be considered as including steps that may be carried out via a user interacting with a browser (shown within a region 112), a user interface of the orchestrator (shown within a region 114), the Docker Engine (shown within a region 116) and the Docker Image Repository (shown within a region 116). Beginning at a start block 120, a user logs in to the Orchestrator user interface, as indicated at block 122. A Container creation form page is opened, as indicated at block 124. Available container images (from the Docker Image Repository) are loaded, as indicated at block 126. The user selects a particular virtual controller image and a number of container instances, as indicated at block 128, and then selects a Create button as indicated at block 130. The Orchestrator UI submits the request to the Docker Engine, as indicated at block 132. In response, the Docker engine downloads the image if not locally available, as indicated at block 134, and then creates the container, as indicated at block 136. Control reverts to the Orchestrator UI, where the Orchestrator UI monitors the container image creation status, as indicated at block 138, and shows the container creation status to the user, as indicated at block 140. The method 110 terminates at a stop block 142.

Figure 6:
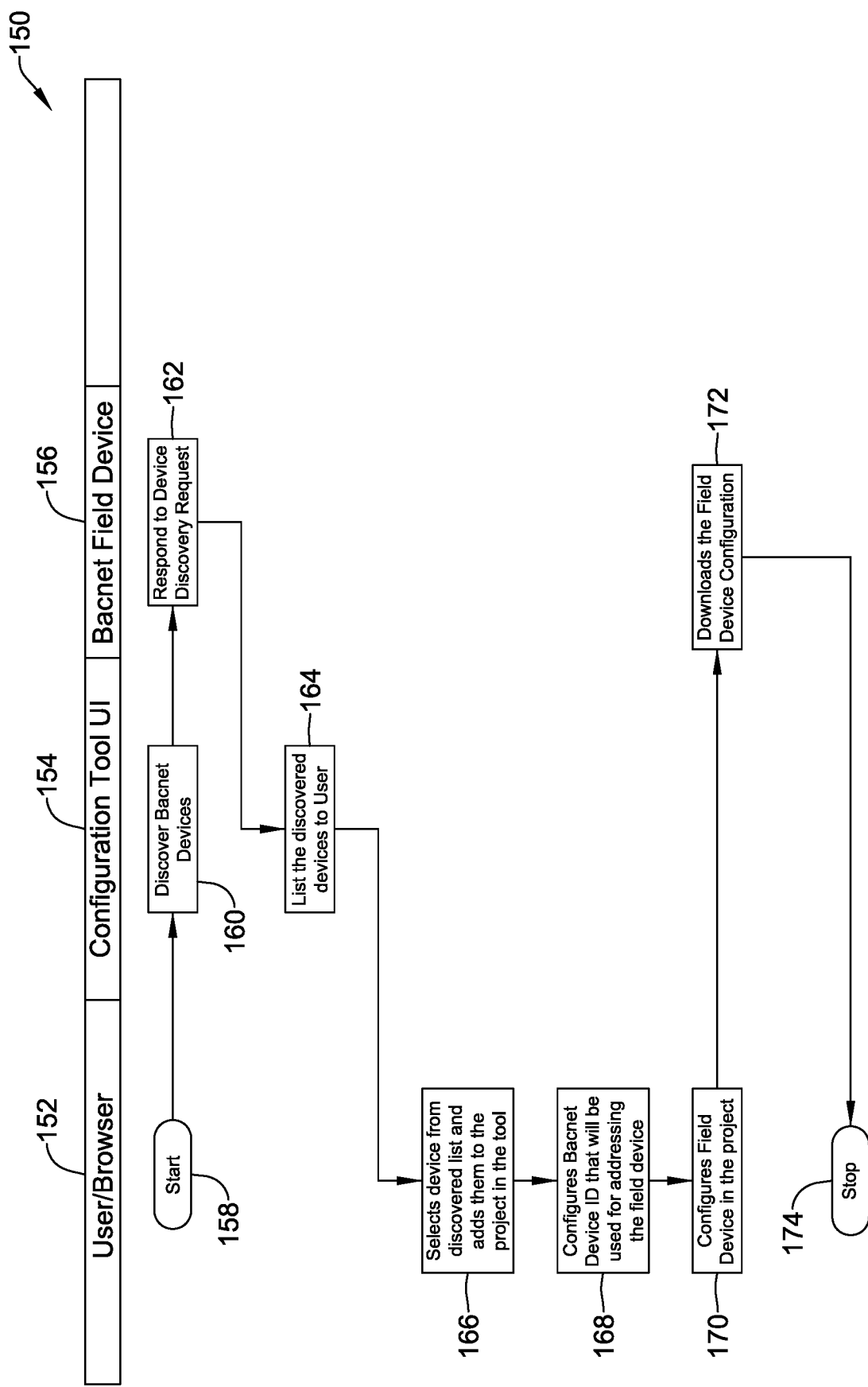
FIG. 6 is a flow diagram showing an illustrative method of adding a new BACnet field device.

FIG. 6 is a flow diagram showing an illustrative method 150 for adding a new BACnet field device. The BACnet field device may be considered as a building control device. It will be appreciated that the illustrative method 150 may be considered as including steps that may be carried out via a user interacting with a browser, as shown within a region 152, a Configuration Tool UI (user interface), as shown within a region 154, and a BACnet field device, as shown within a region 156. Beginning at a start block 158, the Configuration Tool UI discovers available BACnet devices, as indicated at block 160. This may include submitting one or more control commands to the edge controllers to identify the BACnet devices associated with the edge controllers. In response, the available BACnet devices may respond to a device discovery request, as indicated at block 162. The Configuration Tool UI then lists the discovered devices, as indicated at block 164. The user then selects a device from the list and adds to the project, as indicated at block 166. The BACnet device ID is configured, as indicated at block 168. The user configures the BACnet field device properties, as indicated at block 170. The BACnet field device then receives the field device configuration, as indicated at block 172. The method 150 terminates at a stop block 174.

Figure 7:
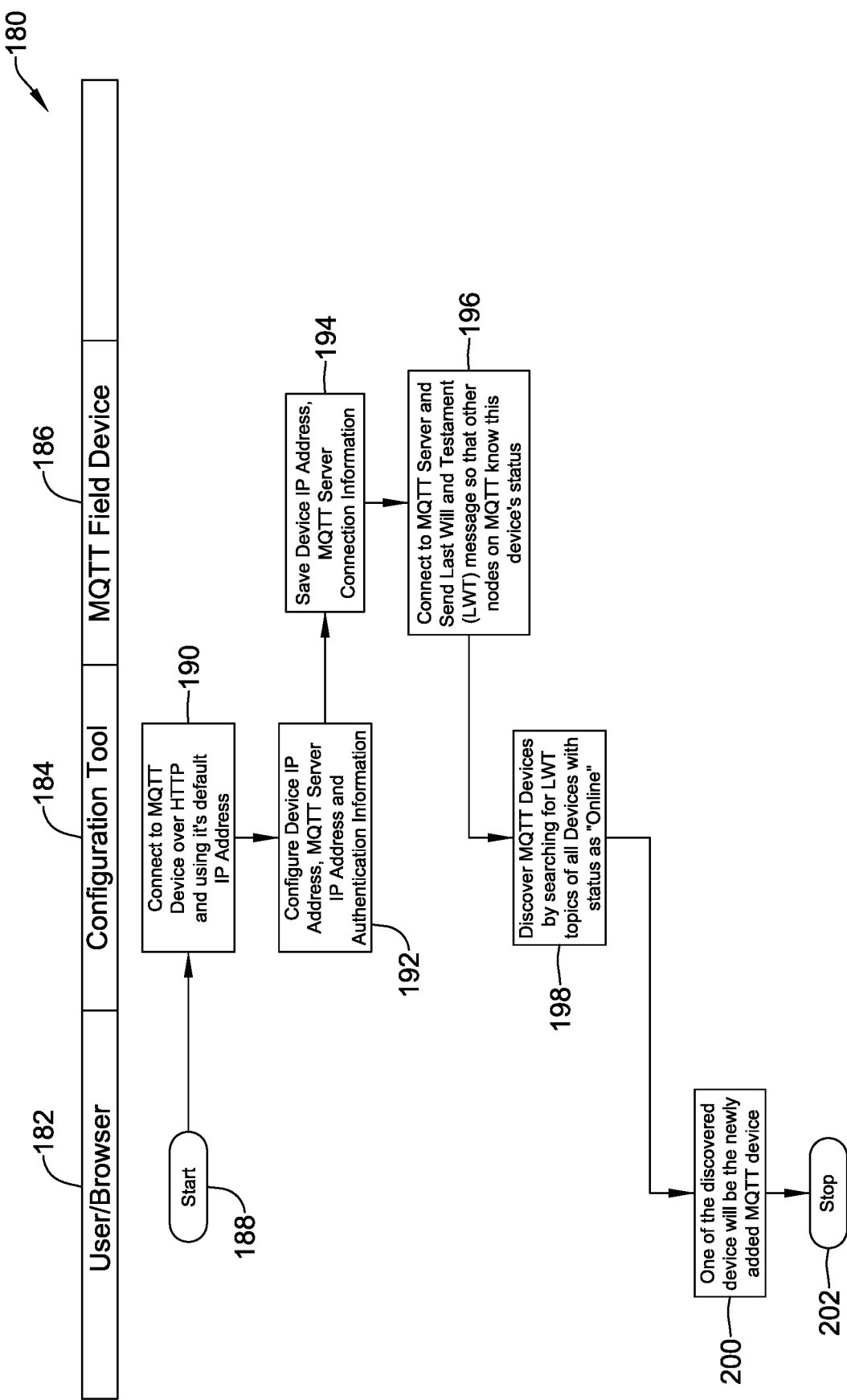
FIG. 7 is a flow diagram showing an illustrative method of adding a new MQTT field device.

FIG. 7 is a flow diagram showing an illustrative method 180 for adding a new MQTT field device. It will be appreciated that the illustrative method 180 may be considered as including steps that may be carried out via a user interacting with a browser, as shown within a region 182, a Configuration Tool (or programming tool), as shown within a region 184, and an MQTT field device, as shown within a region 186. Beginning at a start block 188, the user uses the Configuration Tool to connect to an MQTT device, as indicated at block 190. The user uses the Configuration Tool to configure address and authentication information, as indicated at block 192. The MQTT device saves the address and authentication information, as indicated at block 194. Next, the MQTT device connects to an MQTT server to update its status, including its LWT (Last Will and Testament) as indicated at block 196. The Configuration Tool then discovers devices by searching for the LWT topics, as indicated at block 198. As indicated at block 200, one of the newly discovered devices will be a newly added MQTT device. The method 180 terminates at a stop block 202.

Figure 8:
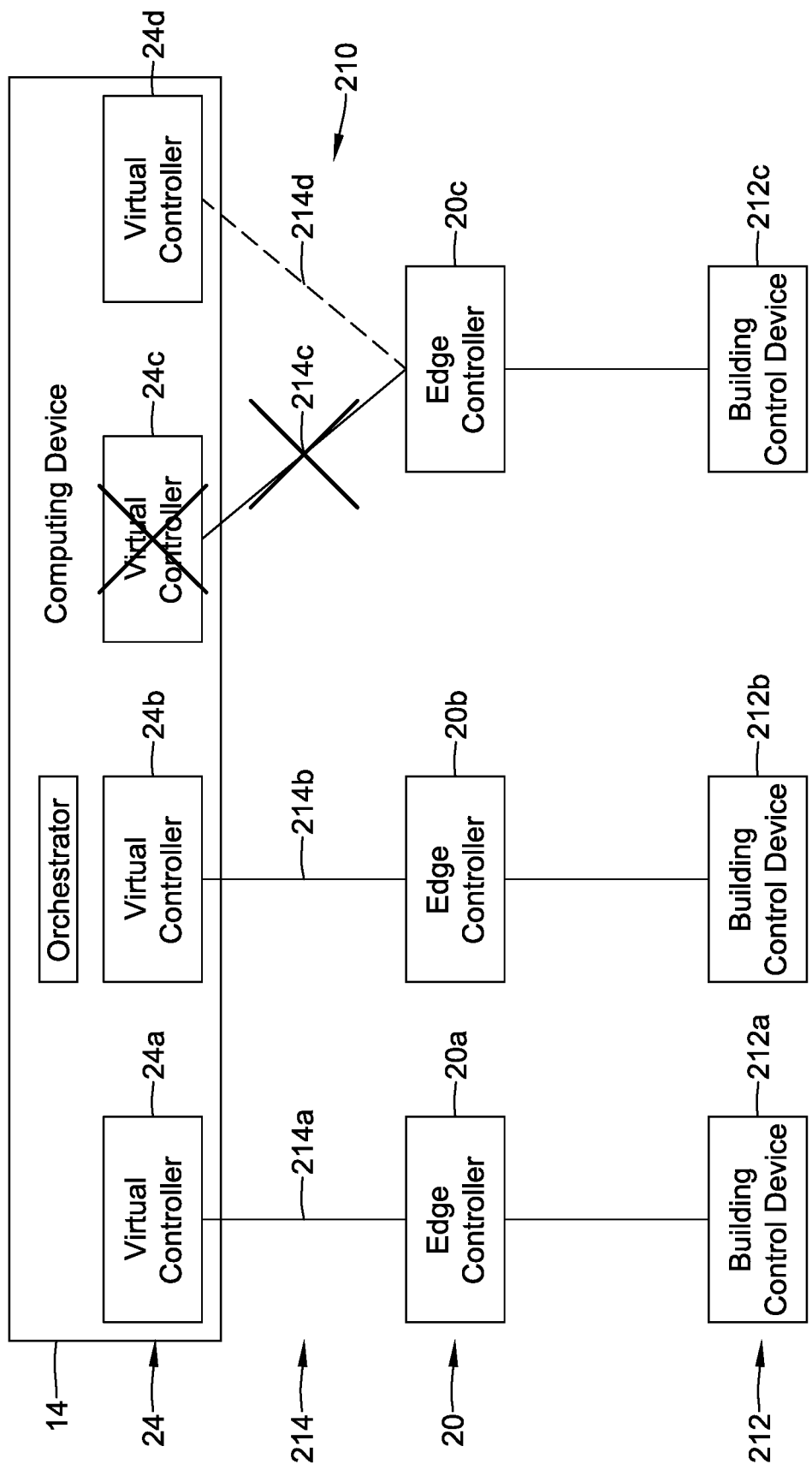
FIG. 8 is a schematic block diagram of an illustrative system.

FIG. 8 is a schematic block diagram showing an illustrative system 210. The illustrative system 210 is similar to the illustrative system 10, in having the computing device 14 hosting a pool of virtual controllers 24 and the orchestrator 26. As shown, each of the virtual controllers 24, individually labeled as 24*a*, 24*b*, 24*c*, 24*d* communicates with the corresponding edge controller 20 via a link 214. The links 214 are individually labeled as 214*a*, 214*b*, 214*c* and 214*d*. The edge controllers 20 are individually labeled as 20*a*, 20*b*, 20*c*. Each of the edge controllers 20 are operably coupled to a corresponding building control device 212, individually labeled as 212*a*, 212*b*, 212*c*.

FIG. 8 illustrates an example of the orchestrator 26 making a determination that a new virtual controller, in this case the virtual controller 24*d*, is needed. A new virtual controller 24 may be added when additional memory and/or processing bandwidth is needed, for example. Another example of why a new virtual controller 24 may be added is for the new virtual controller (in this case, the virtual controller 24*d*) to replace an existing virtual controller 24 (in this case, the virtual controller 24*c*). The new virtual controller 24*d* may represent a fully updated version of the virtual controller 24*c*, for example, and simply swapping out for a new virtual controller 24 may provide a reduction in downtime that could otherwise occur while the old virtual controller 24*c* were updated. In some cases, the orchestrator 26 may decide to form a new virtual controller 24 to replace an existing virtual controller 24 that has gone silent (e.g. crashed).

In the illustrated example, the virtual controller 24*c* was mapped to and in communication via the link 214*c* with the edge controller 20*c*, which is itself in communication and thus in control over the building control device 212*c*. Upon initiating the new virtual controller 24*d*, the orchestrator 26 may initiate a new link 214*d* (i.e. new mapping) between the new virtual controller 24*d* and the edge controller 20*c*. Once operation of the new virtual controller 24*d* is confirmed, the orchestrator 26 may delete the old virtual controller 24*c* and its corresponding link 214*c*.

The orchestrator 26 may be considered as being configured to monitor one or more operational characteristics of each of the plurality of virtual controllers 24 in the pool of virtual controllers 24, and to modify one or more aspects of the pool of virtual controllers 24 when one or more of the operational characteristics of one or more of the plurality of virtual controllers 24 meets predetermined characteristics. For example, modifying one or more aspects of the pool of virtual controllers 24 may include assigning additional memory and/or processing resources of the computing device 14 to one or more of the virtual controllers 24 in the pool of virtual controllers. As another example, modifying one or more aspects of the pool of virtual controllers 24 may include assigning less memory and/or processing resources to one or more of the virtual controllers 24.

In some cases, as illustrated for example in FIG. 8, modifying one or more aspects of the pool of virtual controllers 24 may include replacing a virtual controller 24 in the pool of virtual controllers with a new virtual controller 24 and mapping one or more of the plurality of edge controllers 20 that were associated with the replaced virtual controller 24 to the new virtual controller 24. The new virtual controller 24 may, for example, include an updated firmware version and/or application version relative to the replaced virtual controller. Modifying one or more aspects of the pool of virtual controllers 24 may include adding a new virtual controller 24 to the pool of virtual controllers and mapping one or more of the plurality of edge controllers 20 to the new virtual controller 24.

At least some of the plurality of edge controllers 20 may, for example, be an IO controller that is operatively coupled with the associated at least one building control device 212. Alternatively, at least one of the plurality of edge controllers 20 may be part of the associated at least one building control device 212. In some cases, at least one of the plurality of edge controllers 20 may be configured to provide one or more parameters to two or more of the of the virtual controllers 24 in the pool of virtual controllers. The one or more parameters may include, for example, one or more sensed conditions, one or more operating states and/or one or more alarms.

Figure 9:
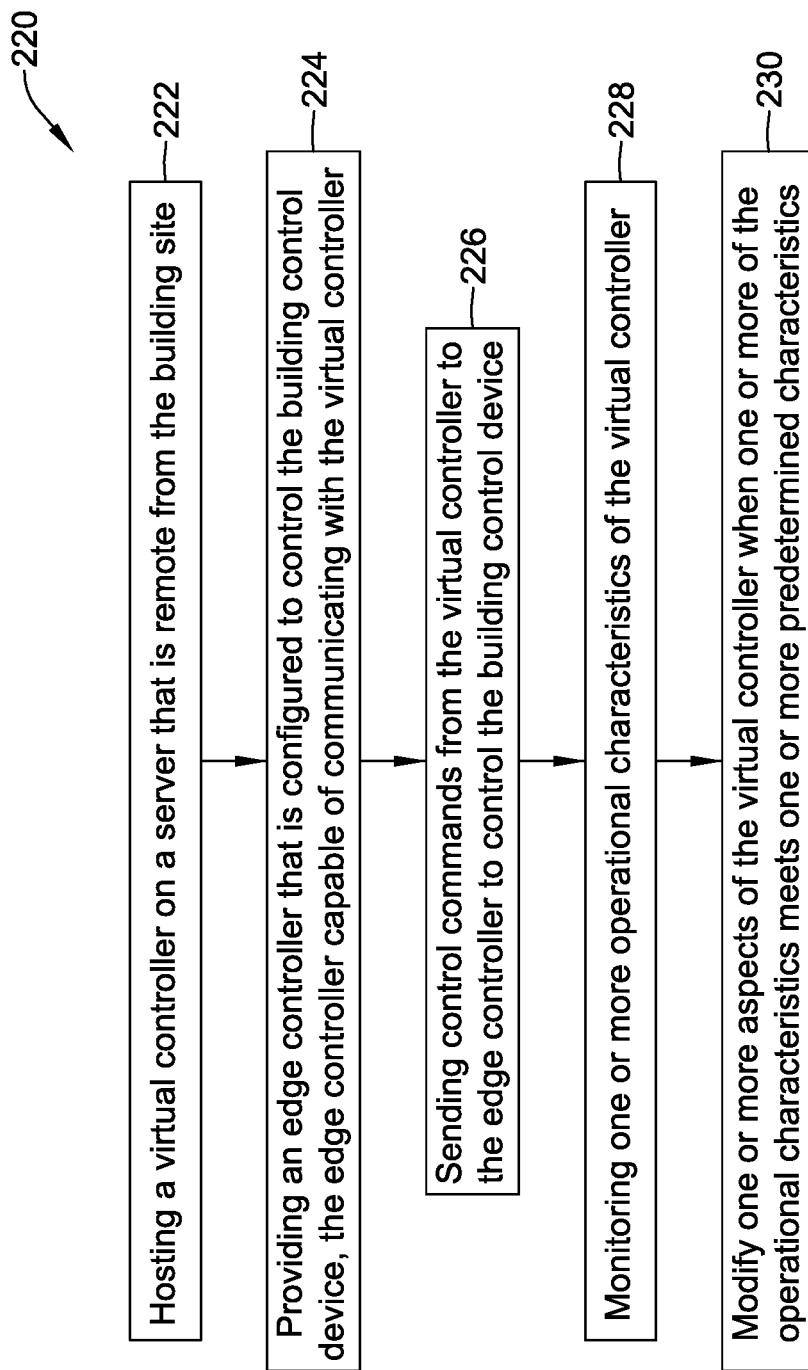
FIG. 9 is a flow diagram showing an illustrative method of controlling operation of a building control device using a virtual controller.

FIG. 9 is a flow diagram showing an illustrative method 220 of controlling operation of a building control device using a virtual controller, the building control device located at a building site. A virtual controller is hosted on a server that is remote from the building site, as indicated at block 222. An edge controller is provided that is configured to control the building control device and that is capable of communicating with the virtual controller, as indicated at block 224. The edge controller may be an IO controller that is operatively coupled with the building control device. In some cases, the edge controller may be part of the building control device. Control commands are sent from the virtual controller to the edge controller to control the building control device, as indicated at block 226. One or more operational characteristics of the virtual controller are monitored, as indicated at block 228. When one or more of the operational characteristics meets one or more predetermined characteristics, one or more aspects of the virtual controller are modified.

In some cases, modifying one or more aspects of the virtual controller may include creating a new virtual controller on the server to replace the existing virtual controller, replacing the existing virtual with the new virtual controller and removing the existing virtual controller. In some instances, the orchestrator may do this automatically in response to a virtual controller failing, or there is a need for increased capacity. As another example, modifying one or more aspects of the virtual controller may include one or more of adding memory resources to the virtual controller, removing memory resources from the virtual controller, adding processing resources to the virtual controller and removing processing resources from the virtual controller.

Figure 10:
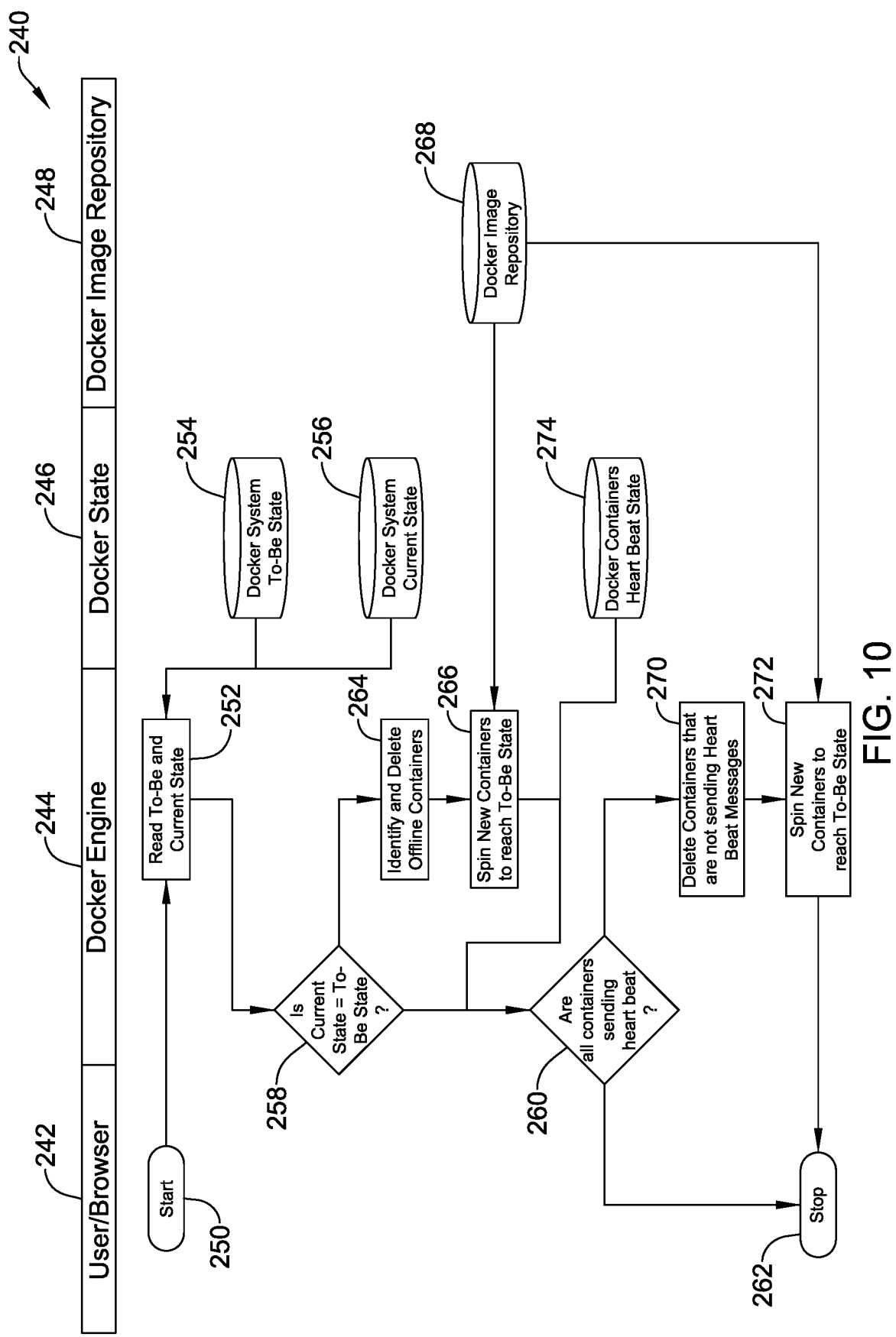
FIG. 10 is a flow diagram showing an illustrative method of handling a virtual controller container crash.

FIG. 10 is a flow diagram showing an illustrative method 240 of handling a virtual controller container crash. It will be appreciated that the illustrative method 240 may be considered as including steps that may be carried out via a user interacting with a browser, as shown within a region 242, a Docker Engine, as shown within a region 244, a Docker State, as shown within region 246, and a Docker Image Repository, as shown within a region 248. Beginning at a start block 250, the Docker Engine reads the To-Be and current state of the virtual controller, as illustrated at block 252. This takes account of information provided by the Docker System To-Be State, as indicated at element 254, and the Docker System Current State, as indicated at element 256. At decision block 258, a determination is made as to whether the current state equals the To-Be state. If yes, control passes to decision block 260, where a determination is made as to whether all virtual controllers are providing a heartbeat message. If yes, control passes to a stop block 262.

Returning to the decision block 258, if the answer is no, control passes to block 264 where offline containers are identified and deleted. At block 266, new containers are spun to reach a To-Be state, using information provided from the Docker Image Repository. Control then passes to the decision block 260. At decision block 260, if there are virtual containers that are not sending heartbeat messages, control passes to block 270, where virtual containers that are not providing heartbeat messages are deleted. At block 272, new containers are spun to reach a To-Be state, using information from the Docker Image Repository. Appropriate building control devices may then be mapped to the new containers. The method 240 terminates at the stop block 262.

Figure 11:
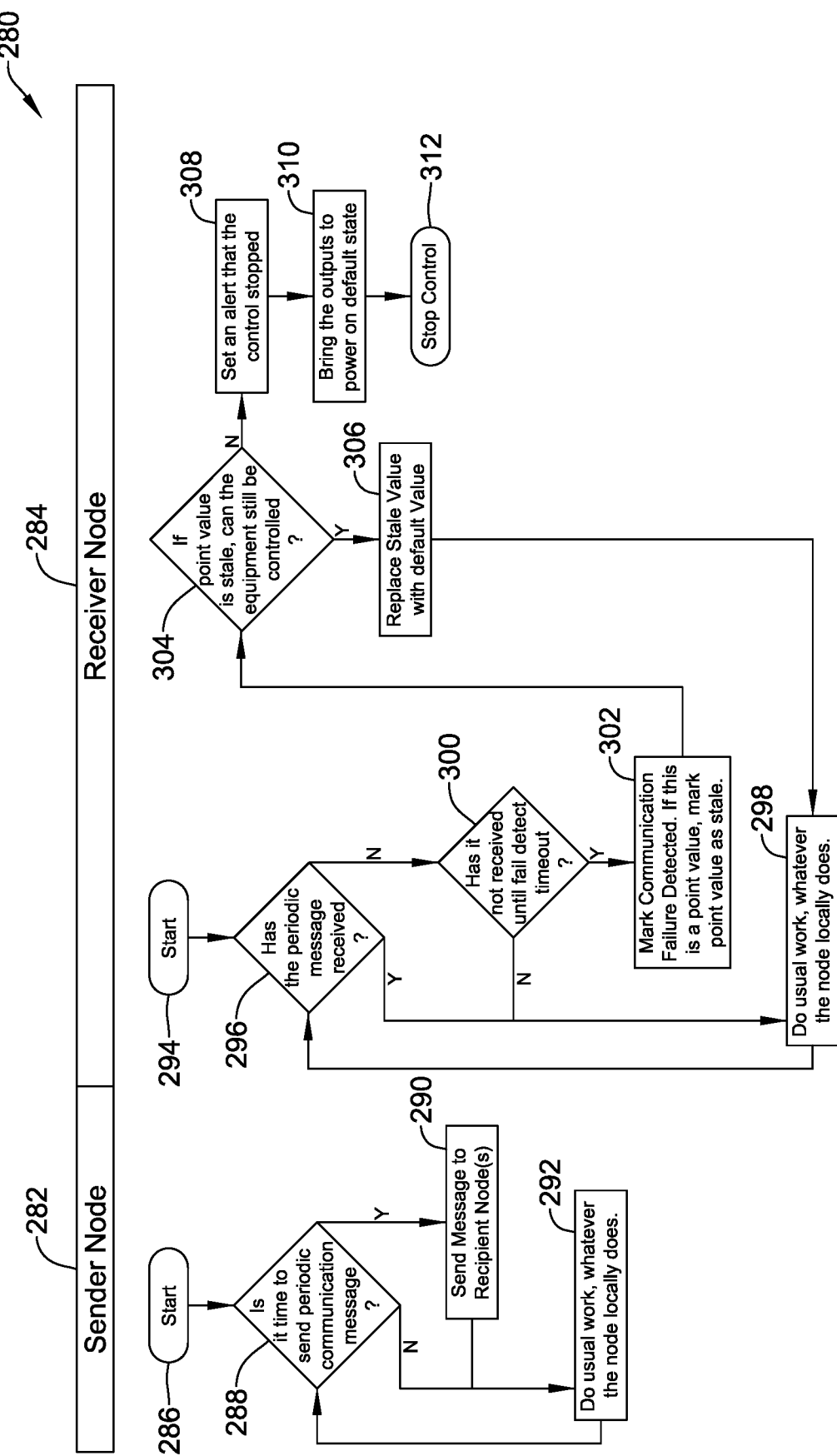
FIG. 11 is a flow diagram showing an illustrative method for detecting communication failure.

FIG. 11 is a flow diagram showing an illustrative method 280 for detecting communication failure. The illustrative method 280 is divided out into a sender node 282 and a receiver node 284. This may apply to any virtual controller or field device that can send and/or receive. Starting with the sender node 282, and a start block 286, control passes to a decision block 288, where a determination is made as to whether it is time to send a periodic message. If yes, control passes to block 290 and one or messages are sent. If not, control passes to block 292, where the node in question carries out whatever work it is supposed to be doing. Control passes back to decision block 288.

Looking now at the receiver node 284, and starting with a start block 294, control passes to a decision block 296, where a determination is made as to whether the periodic message was received. If so, control passes to block 298, where the node in question carries out whatever work it is supposed to be doing. If not, control passes to decision block 300, where a determination is made as to whether a timeout limit has been reached. If so, control passes to block 302 where the communication failure is marked. If not, control passes to block 298 where the node in question carries out whatever work it is supposed to be doing, followed by control reverting back to the decision block 298.

Returning to block 302, control passes to decision block 304 where a determination is made as to whether the equipment can be controlled even with a stale point value. If so, the state value may be replaced with a default value, as indicated at block 306, and control then reverts to block 298. If not, control passes to block 308, where an alert is set that control has stopped. Next, the outputs are powered at a default state, as indicated at block 310. The method stops at a stop control block 312.

Figure 12:
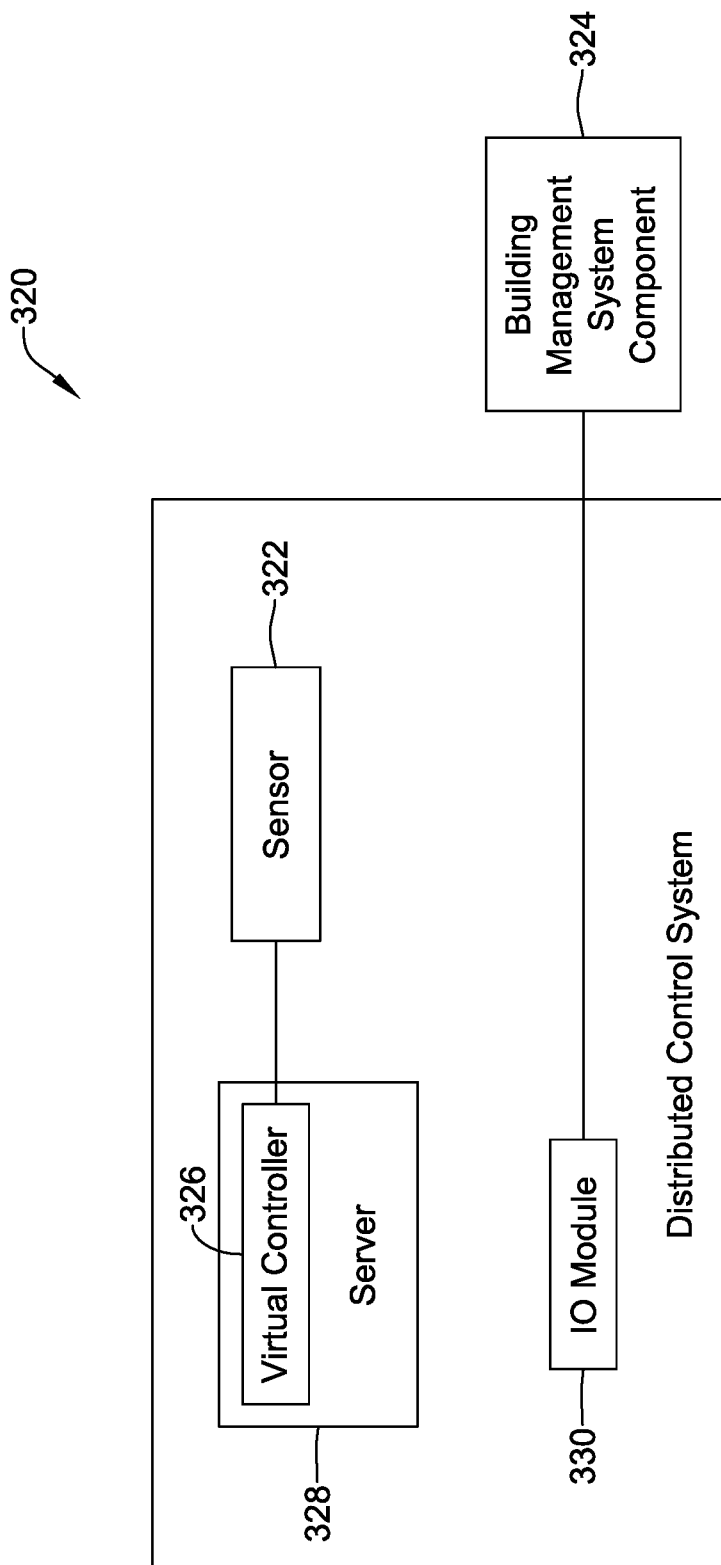
FIG. 12 is a schematic block diagram showing an illustrative distributed control system.

FIG. 12 is a schematic block diagram of an illustrative distributed control system 320 for a building management system component of a building. The distributed control system 320 includes a sensor 322 that is configured to provide a sensor value that is useful in operation of a building management system component 324. The building management system component 324 may be an actuator, a valve or a damper, for example. A virtual controller 326 is hosted on a server 328 and is operably coupled with the sensor 322 and the building management system component 324. The virtual controller 326 is configured to send control commands to the building management system component 324 in accordance with the sensor value received from the sensor 322. An IO module 330 is configured to communicate with the virtual controller 326 and provide local control commands to the building management system component 324. The IO module 330 may be an example of an edge controller. The local control command are based upon the control commands from the virtual controller 326 when communication with the virtual controller 326 is determined by the IO module 330 to be functioning normally and is based upon one or more fail-safe commands generated by the IO module 330 when communication with the virtual controller 326 is determined by the IO module 330 to not be functioning normally. In some cases, one or more fail-safe commands implement a fail-safe control loop that controls the building management system component in a fail-safe manner.

In some cases, when communication with the sensor 322 is determined to not be functioning normally by the virtual controller 326, one or more of the control commands sent by the virtual controller 326 may include a default value. When communication with the sensor 322 is determined to not be functioning normally by the virtual controller 326, the virtual controller 326 may be configured to use a default sensor value or a last sensor value for the sensor value. When the sensor value received from the sensor 322 is determined to be out of a valid range by the virtual controller 326, the virtual controller 326 may be configured to use a default sensor value that is within range.

In some instances, when communication with the virtual controller 326 is determined by the IO module 330 to be functioning normally, the local control commands implement an inner control loop for controlling the building management system component 324 and the control commands from the virtual controller 326 implement an outer control loop for controlling the building management system component 324, wherein the inner control loop and the outer control loop form at least part of the distributed control system 320. When communication with the virtual controller 326 is determined by the IO module 330 to not be functioning normally, the inner control loop may implement or may be changed to implement a fail-safe control loop. In some cases, communication is determined by the IO module 330 to be functioning normally when the IO module 330 periodically receives an expected signal (e.g. a heartbeat signal) from the virtual controller 326. Communication may be determined by the IO Module 330 to not be functioning normally when the IO module 330 does not receive an expected signal (e.g. a heartbeat signal) from the virtual controller 326 for a predetermined period of time. In some cases, the IO module 330 may be configured to maintain a communications log of received communications and/or communication events and/or failures. The IO module 330 may be configured to report communications issues, based upon the communications log, back to the virtual controller 326 from time to time or upon request.

Figure 13:
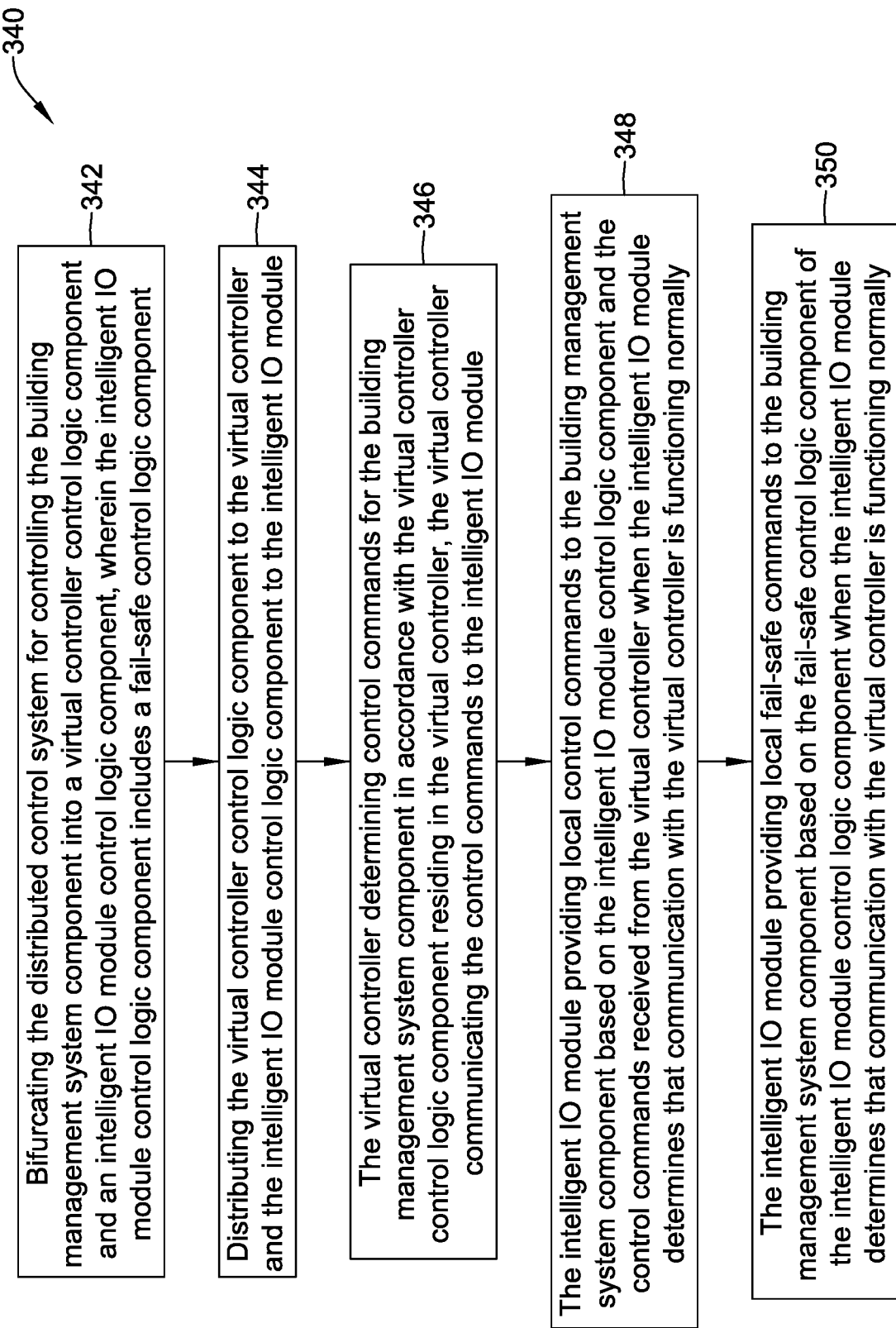
FIG. 13 is a flow diagram showing an illustrative method of controlling operation of a building management system component using a distributed control system.

FIG. 13 is a flow diagram showing an illustrative method 340 of controlling operation of a building management system component using a distributed control system that includes a virtual controller spawned on a server, and an intelligent IO module that receives control commands from the virtual controller and provides local control commands to the building management system component. The intelligent IO module may be an example of an edge controller. The distributed control system for controlling the building management system component is bifurcated into a virtual controller control logic component and an intelligent IO module control logic component, wherein the intelligent IO module control logic component includes a fail-safe control logic component, as indicated at block 342. The virtual controller control logic component is distributed to the virtual controller and the intelligent IO module control logic component is distributed to the intelligent IO module, as indicated at block 344. The virtual controller determines control commands for the building management system component in accordance with the virtual controller control logic component residing in the virtual controller, the virtual controller communicating the control commands to the intelligent IO module, as indicated at block 346. The intelligent IO module provides local control commands to the building management system component based on the intelligent IO module control logic component and the control commands received from the virtual controller when the intelligent IO module determines that communication with the virtual controller is functioning normally, as indicated at block 348. The intelligent IO module provides local fail-safe commands to the building management system component based on the fail-safe control logic component of the intelligent IO module control logic component when the intelligent IO module determines that communication with the virtual controller is not functioning normally, as indicated at block 350.

In some cases, the distributed control system may also include a sensor that provides a sensor value used by the virtual controller in determining control commands for the building management system component. When communication with the sensor is determined to not be functioning normally by the virtual controller, one or more of the control commands sent by the virtual controller include a default value. In some cases, the sensor value may be used by the virtual controller in determining control commands for the building management system component. When the sensor value received from the sensor is determined to be out of a valid range by the virtual controller, the virtual controller may be configured to use a default sensor value. The default sensor value may be a predetermined sensor value, a last known valid sensor value, an average sensor value over a past time period, or any other suitable sensor value.

In some cases, the fail-safe control logic component employs a closed loop control algorithm when controlling the building management system component. In some instances, the intelligent IO module control logic component implements an inner control loop for controlling the building management system component and the virtual controller control logic component implements an outer control loop for controlling the building management system component, wherein when communication with the virtual controller is determined by the intelligent IO module to not be functioning normally, the inner control loop implements the fail-safe control logic component.

Figure 14:
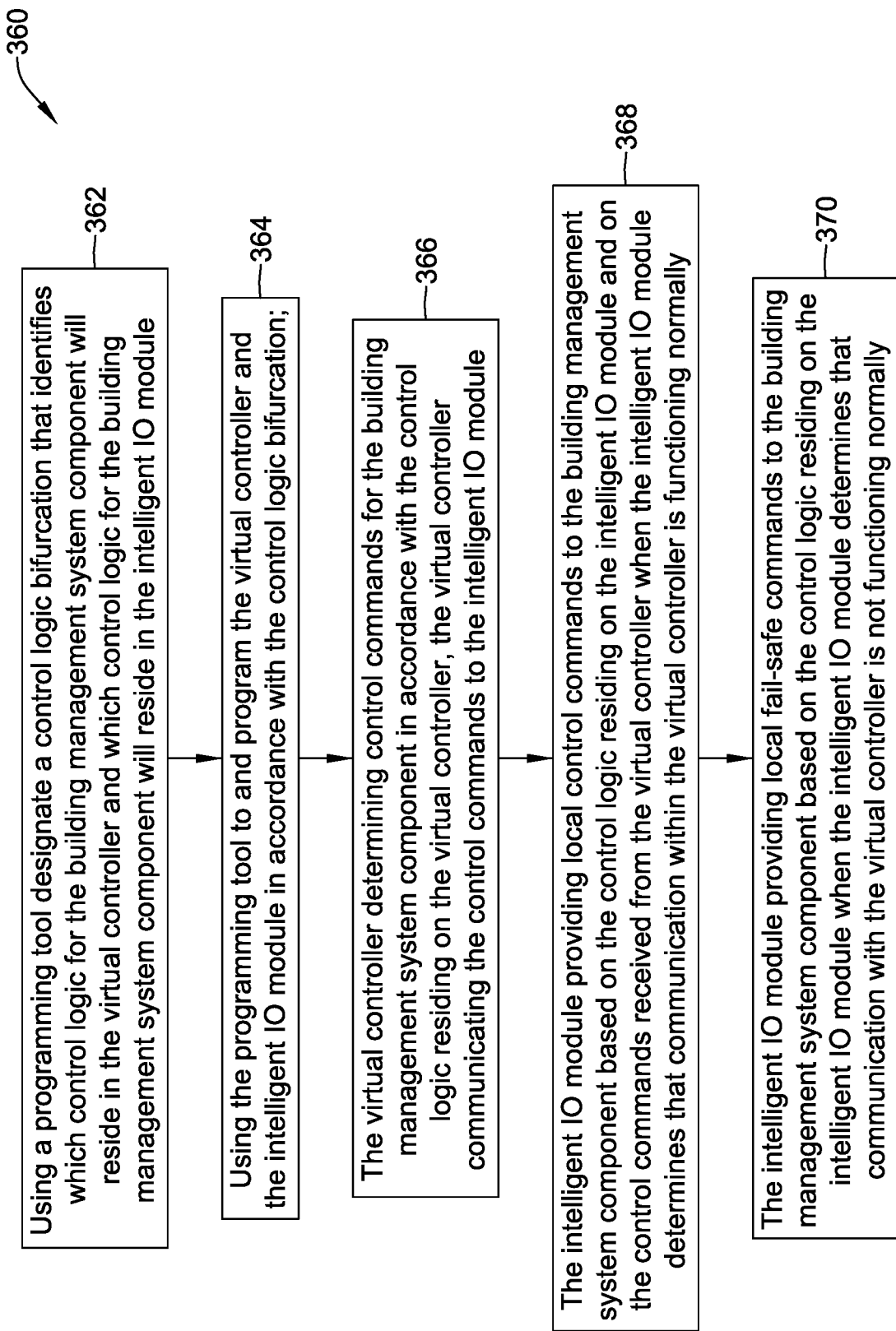
FIG. 14 is a flow diagram showing an illustrative method of controlling operation of a building management system component.

FIG. 14 is a flow diagram showing an illustrative method 360 of controlling operation of a building management system component using a virtual controller and an intelligent IO module that receives control commands from the virtual controller and provides local control commands to the building management system component. A programming tool is used to designate a control logic bifurcation that identifies which control logic for the building management system component will reside in the virtual controller and which control logic for the building management system component will reside in the intelligent IO module, as indicated at block 362. The programming tool is used to program the virtual controller and the intelligent IO module in accordance with the control logic bifurcation, as indicated at block 364. The virtual controller determines control commands for the building management system component in accordance with the control logic residing on the virtual controller, the virtual controller communicating the control commands to the intelligent IO module, as indicated at block 366. The intelligent IO module provides local control commands to the building management system component based on the control logic residing on the intelligent IO module and on the control commands received from the virtual controller when the intelligent IO module determines that communication within the virtual controller is functioning normally, as indicated at block 368. The intelligent IO module providing local fail-safe commands to the building management system component based on the control logic residing on the intelligent IO module when the intelligent IO module determines that communication with the virtual controller is not functioning normally, as indicated at block 370.

Figure 15:
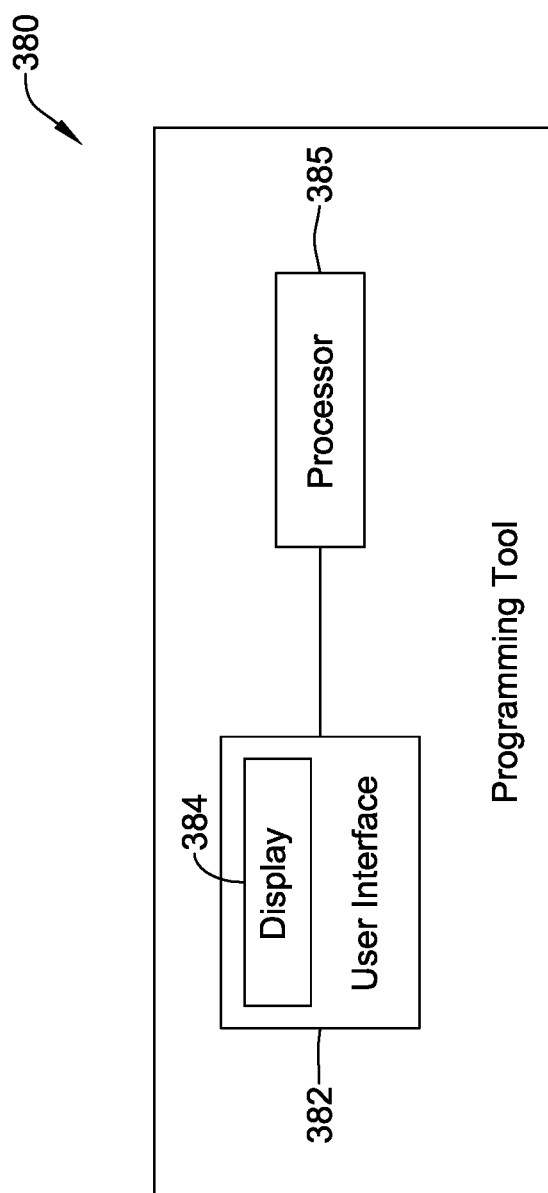
FIG. 15 is a schematic block diagram of an illustrative programming tool.

FIG. 15 is a schematic block diagram of an illustrative programming tool 380 that is configured to permit a user to configure a distributed building management system that includes a virtual controller and an edge controller for controlling a building control device using a distributed control logic that is distributed between the virtual controller and the edge controller, wherein the virtual controller provides control commands to the edge controller and the edge controller provides device commands to the building control device. The programming tool 380 includes a user interface 382 that includes a display 384 that is configured to display information for a user. The user interface 382 is also configured to receive input from the user. A processor 385 is operably coupled to the user interface 382 and is configured to display a graphical representation of the distributed control logic on the user interface 382. The processor 385 is configured to determine which portions of the distributed control logic are considered critical and which portions of the distributed control logic are not considered critical to the operation of the building control device should the edge controller stop receiving control commands from the virtual controller. The processor 385 is configured to download the portions of the distributed control logic that are determined to be critical to the edge controller for execution by the edge controller, such that the edge controller executes the distributed control logic that is determined to be critical when subsequently controlling the building control device, and to download the portions of the distributed control logic that are not determined to be critical to the virtual controller for execution by the virtual controller, such that the virtual controller executes the distributed control logic that is not determined to be critical when subsequently controlling the building control device.

In some cases, the processor 385 is further configured to display the graphical representation of the distributed control logic and to permit the user to select which portions of the distributed control logic are considered critical and/or which portions of the distributed control logic are considered non critical. The processor 385 may, for example, be configured to implement artificial intelligence (AI) to help ascertain which portions of the distributed control logic are considered critical and which portions of the distributed control logic are considered not critical. The processor 385 may be further configured to simulate execution of the distributed control logic in order to help verify the combined functionality of the distributed control logic. This may include simulating a communication channel between the virtual controller and the edge controller when simulating execution of the distributed control logic. In some cases, the distributed control logic includes a plurality of function blocks, and wherein the plurality of function blocks have a designated execution order.

In some cases, the processor 385 may be configured to display a wire sheet that represents the distributed control logic using a plurality of function blocks, where some of the plurality of function blocks are assigned to the virtual controller for execution and some of the plurality of function blocks are assigned to the edge controller for execution. The processor 385 may be configured to simulate each of the plurality of function blocks one at a time, with outputs from each function block shared with inputs for subsequent function blocks, regardless of whether each function block is assigned to the virtual controller or to the edge controller. The processor 385 may be configured to determine an estimate of resources requirements for the virtual controller and/or the edge controller in order to execute the assigned function blocks.

Figure 16:
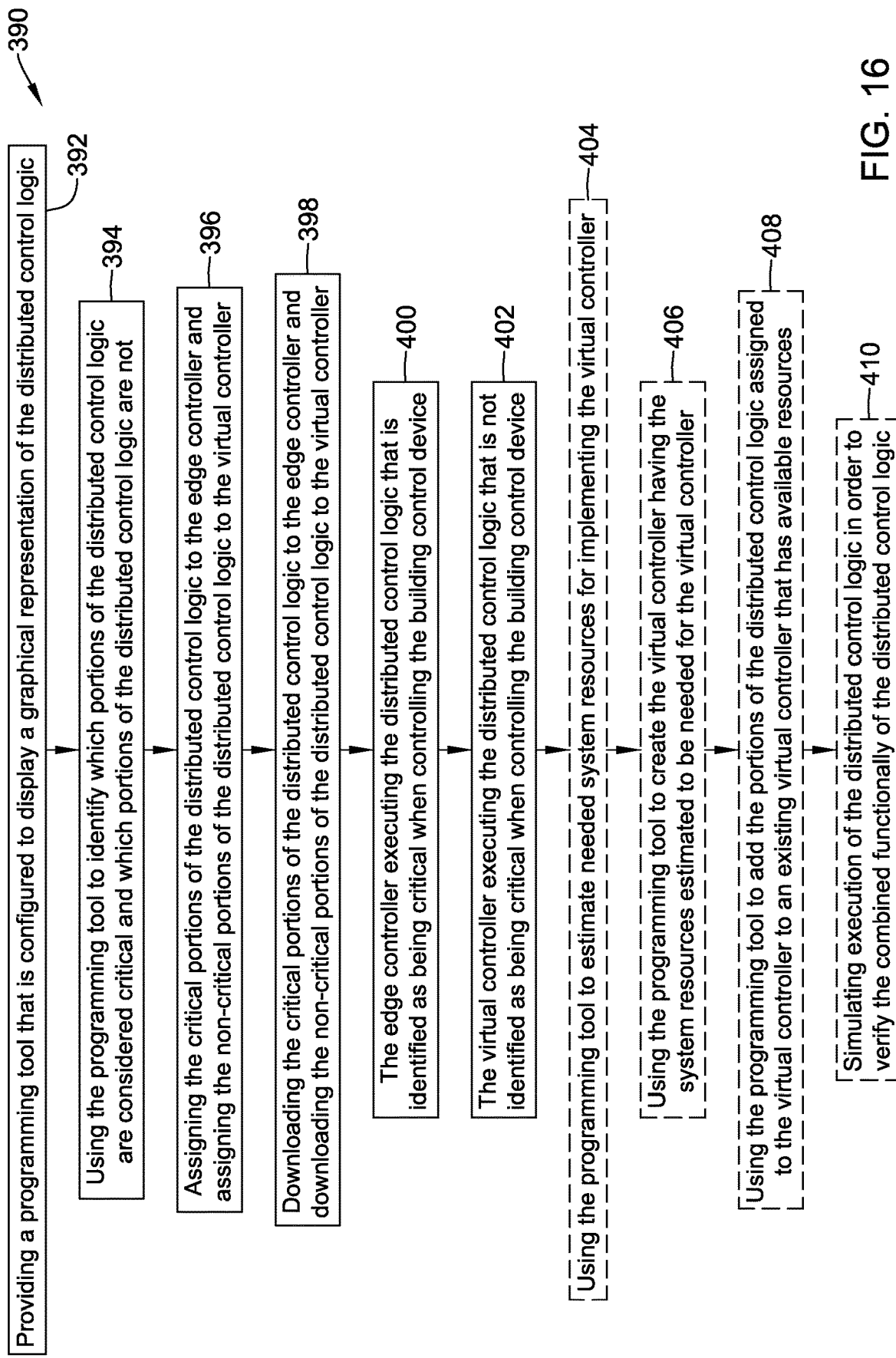
FIG. 16 is a flow diagram showing an illustrative method of configuring a distributed building management system using a programming tool.

FIG. 16 is a flow diagram showing an illustrative method 390 of configuring a distributed building management system that includes a virtual controller and an edge controller for controlling a building control device using a distributed control logic that is distributed between the virtual controller and the edge controller, wherein the virtual controller provides control commands to the edge controller and the edge controller provides device commands to the building control device. A programming tool is provided that is configured to display a graphical representation of the distributed control logic, as indicated at block 392. The programming tool is used to identify which portions of the distributed control logic are considered critical and which portions of the distributed control logic are considered not critical to a fail-safe operation of the building control device should the edge controller stop receiving control commands from the virtual controller, as indicated at block 394. The portions of the distributed control logic that are identified as being critical are assigned to the edge controller and the portions of the distributed control logic that are not identified as being critical are assigned to the virtual controller, as indicated at block 396.

The portions of the distributed control logic that are identified as being critical are downloaded to the edge controller and the portions of the distributed control logic that are not identified as being critical are downloaded to the virtual controller, as indicated at block 398. The edge controller executes the distributed control logic that is identified as being critical when controlling the building control device, as indicated at block 400. The virtual controller executes the distributed control logic that is not identified as being critical when controlling the building control device, as indicated at block 402.

In some cases, using the programming tool to identify which portions of the distributed control logic are considered critical and which portions of the distributed control logic are considered not critical includes allowing a user of the programming tool to select and tag which portions of the distributed control logic are considered critical and/or which portions of the distributed control logic are considered not critical. In some instances, using the programming tool to identify which portions of the distributed control logic are critical and which portions of the distributed control logic are not critical includes the programming tool implementing artificial intelligence (AI) to ascertain which portions of the distributed control logic are critical and which portions of the distributed control logic are not critical. The AI may learn over time which function blocks and under what circumstances those function blocks should be deemed critical function blocks and assigned to the edge controller.

The virtual controller may be hosted on a computing device, the virtual controller including a virtual container or a virtual machine that includes the portions of the distributed control logic that are not identified as being critical. The edge controller may be associated with the building control device and may include the portions of the distributed control logic that are identified as being critical. In some cases, the edge controller may be an IO module that is assigned to the virtual controller and assigned to the building control device.

In some cases, and as optionally indicated at block 404, the programming tool may be used to estimate needed system resources for implementing the virtual controller and/or edge controller. The programming tool may be used to create the virtual controller having the system resources estimated to be needed for the virtual controller, as optionally indicated at block 406. The programming tool may be used to add the portions of the distributed control logic assigned to the virtual controller to an existing virtual controller that has available resources. In some cases, the programming tool may notify the user if the estimated needed resources for the edge controller exceed the resources that are available on the edge controller. When this occurs, the user may move some of the control functions to the virtual controller, assign some of the functions to another edge controller, and/or upgrade the hardware of the edge controller to include the estimated needed resources.

The graphical representation of the distributed control logic may include a wire sheet with the distributed control logic represented as a plurality of function blocks displayed on the wire sheet. The plurality of function blocks may have a designated execution order, sometimes designated by the user. The method may include simulating execution of the plurality of function blocks in order to verify the combined functionality of the distributed control logic, as optionally indicated at block 410. A communication channel between the virtual controller and the edge controller may be simulated when simulating execution of the plurality of function blocks.

Figure 17:
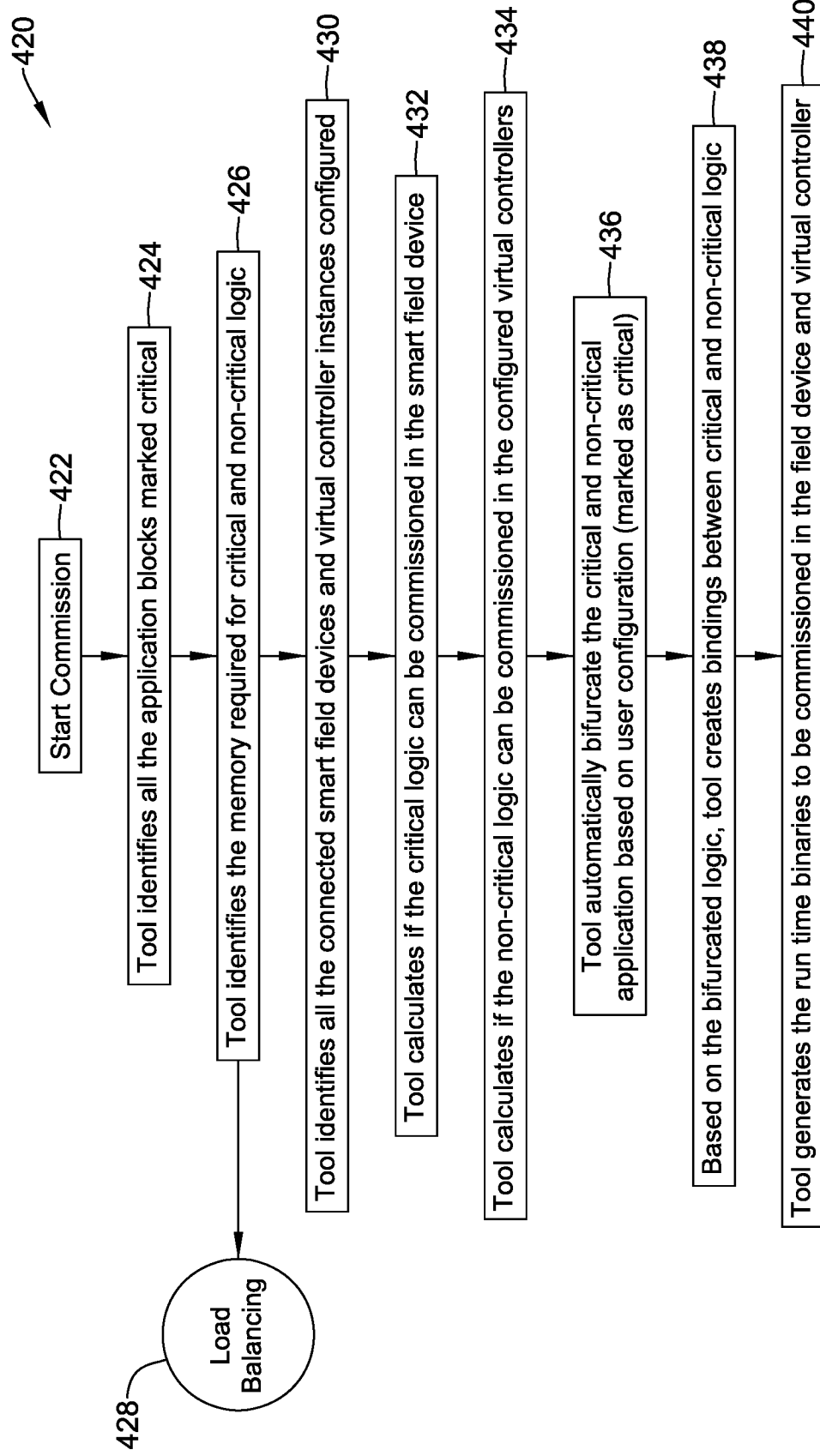
FIG. 17 is a flow diagram showing an illustrative method of bifurcating an application into critical and non-critical components.

FIG. 17 is a flow diagram showing an illustrative method 420 of bifurcating an application into critical and non-critical components using a tool such as the programming tool 50 (FIG. 2) or the programming tool 380 (FIG. 15). It will be appreciated that the programming tool may be considered as being an example of the configuration tool referenced in discussion of FIGS. 6 and 7. The method 420 begins at block 422. At block 424, the tool identifies all of the application blocks (e.g. function blocks) that are marked as critical. At block 426, the tool identifies the memory needed for both the critical logic and the non-critical logic, and then passes to a load balancing process 428, which will be detailed with respect to FIG. 18. At block 430, the tool identifies connected smart field devices (e.g. edge controllers) and virtual controllers. At block 432, the tool determines if the critical logic can be commissioned in the smart field devices while at block 434, the tool determines if the non-critical logic can be commissioned in the virtual controller(s) that have been configured. As indicated at block 436, the tool may automatically bifurcate or may facilitates a manually bifurcation of the critical logic and the non-critical logic. Based on the bifurcated logic, the tool creates bindings between the critical and non-critical logic, as indicated at block 438. The tool then generates the run time binaries to be commissioned in the smart field device and in the virtual controller, as indicated at block 440.

Figure 18:
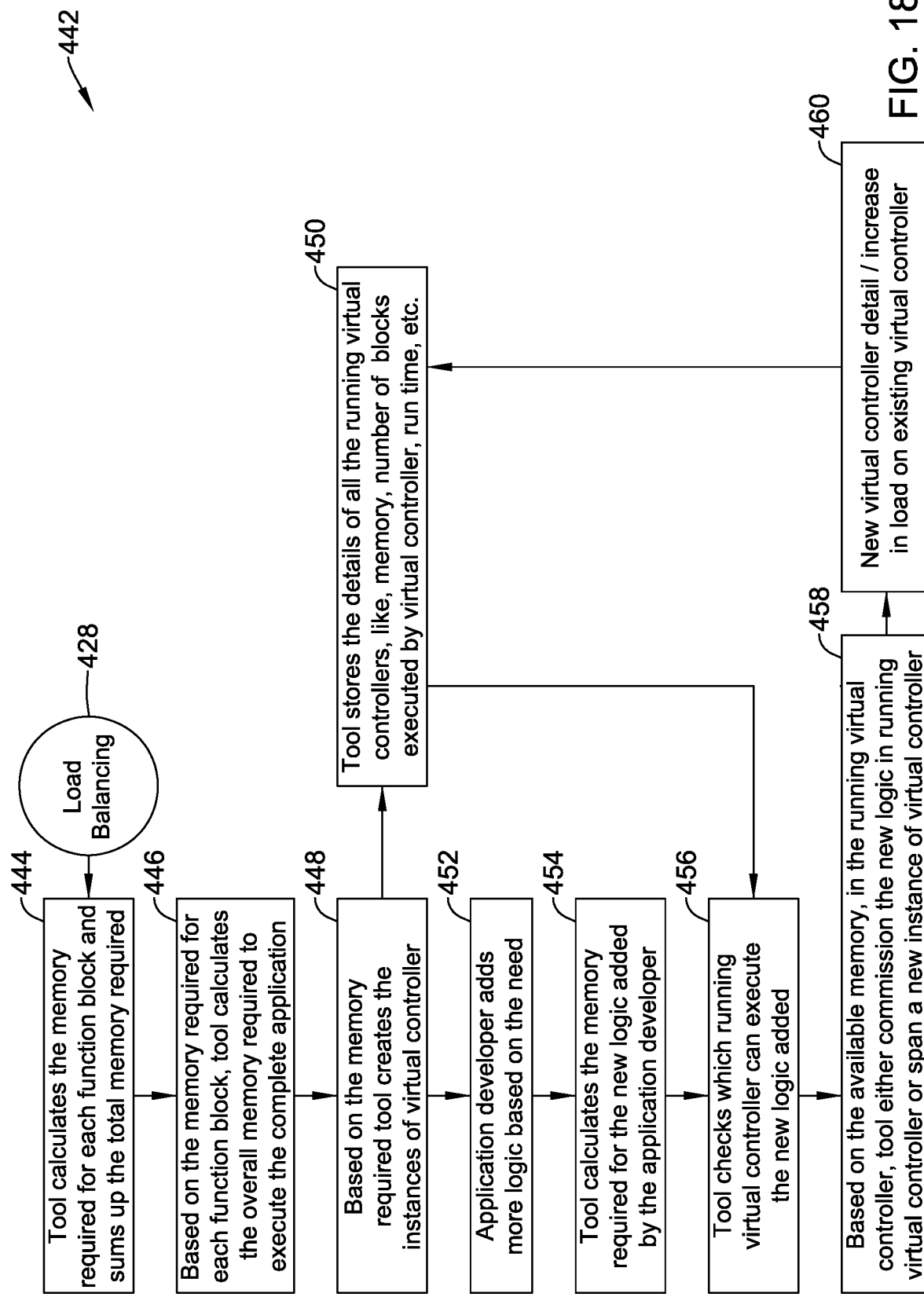
FIG. 18 is a flow diagram showing an illustrative method of performing load balancing.

FIG. 18 is a flow diagram showing an illustrative method 442 of carrying out load balancing. The illustrative method 442 may be considered as being part of the method 420. The method 442 begins at block 444, where the tool calculates memory needed for each function block. At block 446, the tool calculates the overall memory needed to execute the application. At block 448, the tool creates instances of virtual controllers, based on the memory requirements. The tool stores details of all of the running virtual controllers, as indicated at block 450. At block 452, the developer (e.g. user) has added additional logic to the application. The tool calculates the memory needed for the new logic as indicated at block 454. At block 456, the tool checks to see if any of the running virtual controllers can accommodate the new logic. At block 458, the tool either commissions the new logic within an existing virtual controller or spawns a new virtual controller to accommodate the new logic. The details of the new virtual controller, as referenced at block 460, are saved in the tool, as referenced at block 450.

Figure 19:
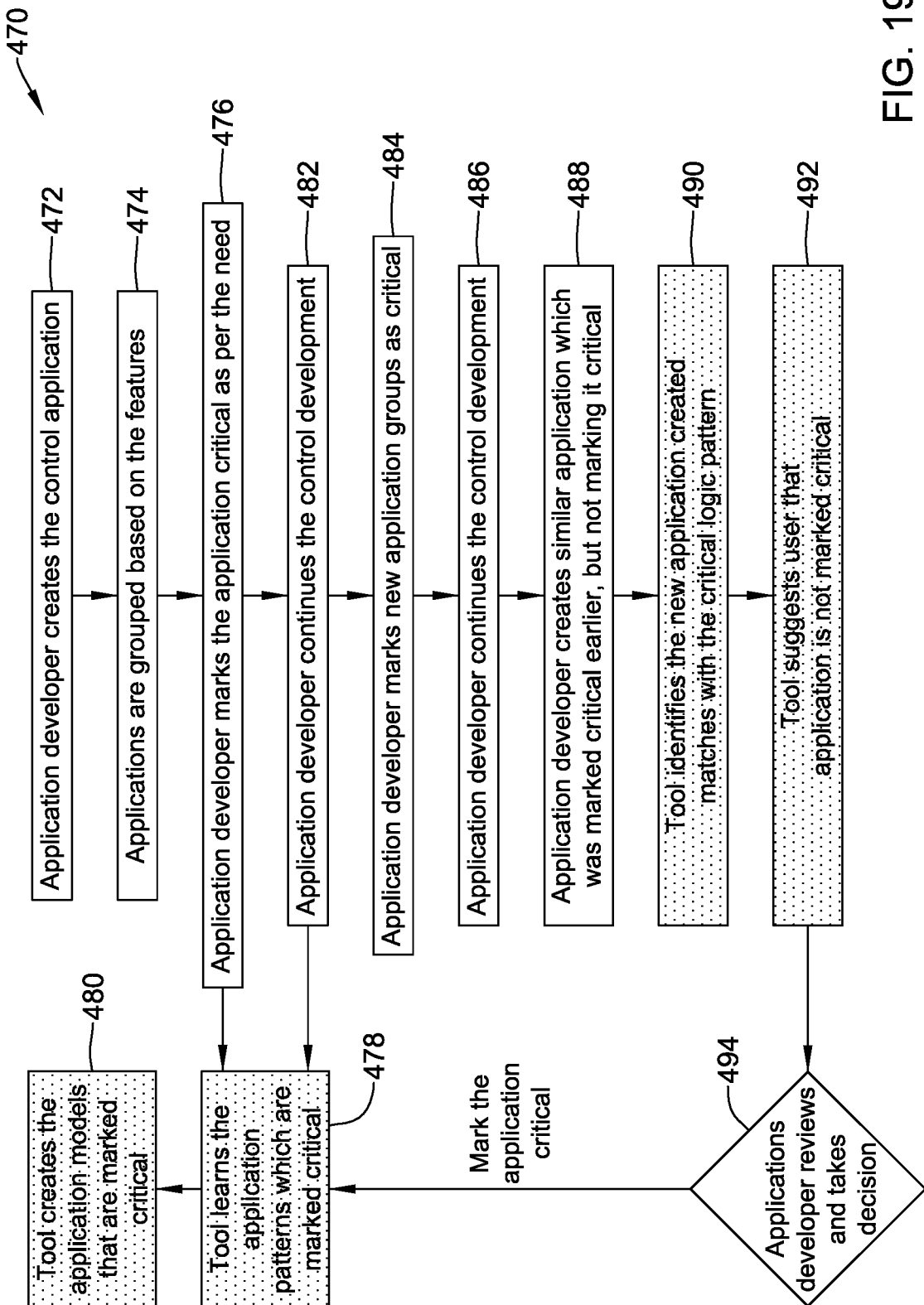
FIG. 19 is a flow diagram showing an illustrative method of how artificial intelligence may be used in bifurcating an application into critical and non-critical components.

FIG. 19 is a flow diagram showing an illustrative method 470 of bifurcating an application into critical and non-critical components using artificial intelligence (AI). It should be noted that the shaded blocks in FIG. 19 indicate steps carried out via AI. The method 470 begins at block 472, where an application developer creates a control application. The control application may be considered a function block. The applications (e.g. function blocks) are grouped in accordance with their features, as indicated at block 474. At block 476, the developer marks the application (e.g. function block) as critical. At block 478, the tool utilizes AI to learn which application (e.g. function block) patterns are marked as being critical. The tool uses AI to create the application models (e.g. function blocks) that are marked critical, as indicated at block 480.

Returning to block 476, control passes to block 482, where the developer continues the control development. The developer marks new application groups (e.g. function blocks) as being critical, as indicated at block 484. It will be appreciated that blocks 482 and 484 may iterate multiple times. The application developer continues, as indicated at block 486. At block 488, the application developer creates a new similar application that was previously marked critical, but is not now marked critical. At block 490, the tool uses AI to match logical patterns, and suggests to the user at block 492 that the application is not marked critical but possibly should be. At block 494, the application developer reviews and decides that the new application should indeed be marked critical. The application is subsequently marked as being critical.

Figure 20:
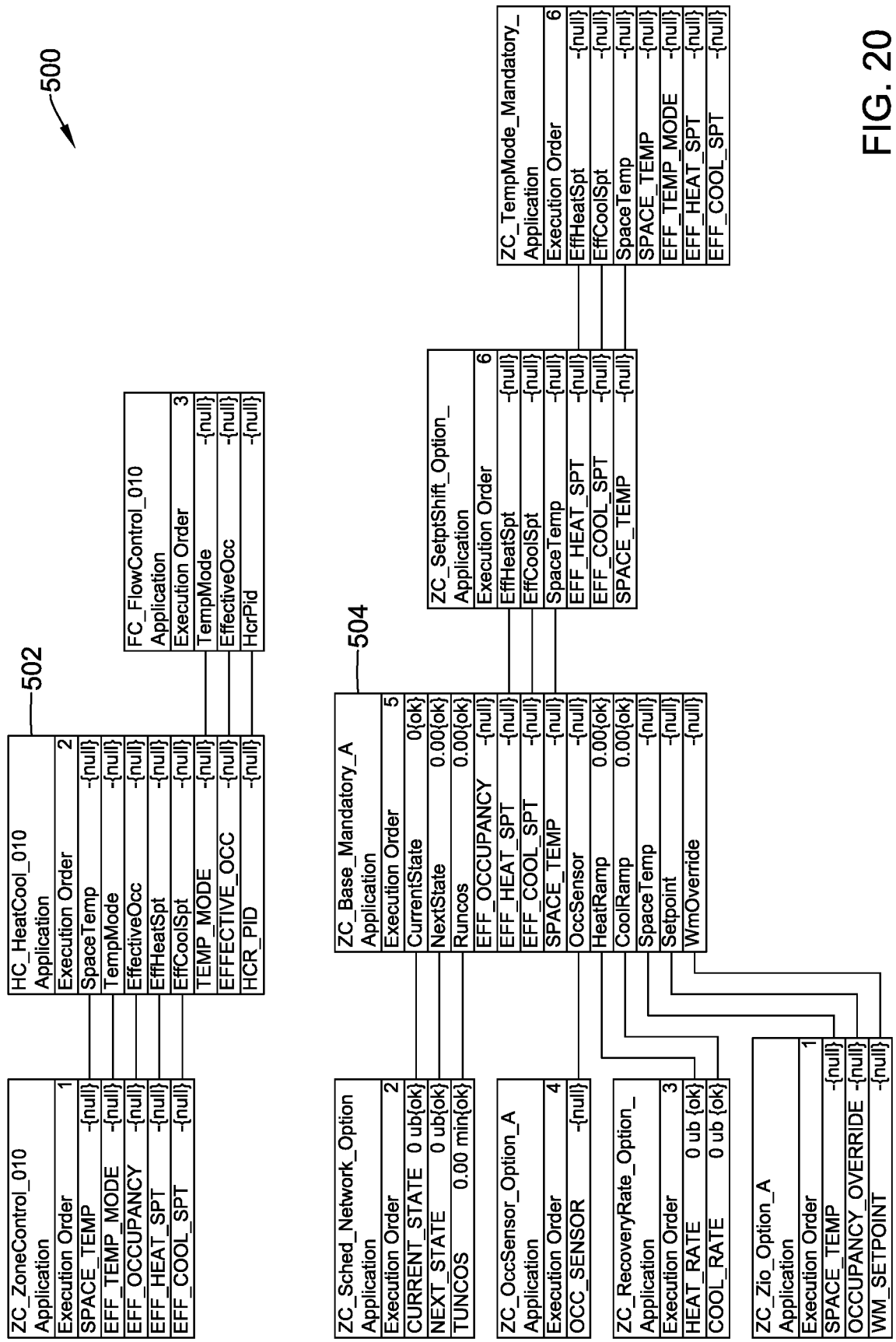
FIGS. 20-23 are screen shots of wire screens that may be displayed by the tool in bifurcating an application into critical and non-critical components.

FIGS. 20-23 are screen shots of wire screens that may be displayed by the tool when indicating particular function blocks as being critical or non-critical, and thus ultimately assigned to a virtual controller or to an edge controller for execution. FIG. 20 is a screen shot showing a wire screen 500. The wire screen 500 includes a number of individual function blocks as well as how the inputs and outputs of each of the individual function blocks are logically connected. The function blocks include a function block 502, labeled HC_HeatCool_010 and a function block 504, labeled ZC_Base_Mandatory_A. These particular function blocks 502, 504 are of interest because as will be shown in subsequent Figures, these function blocks 502, 504 will be labeled as being critical.

Figure 21:
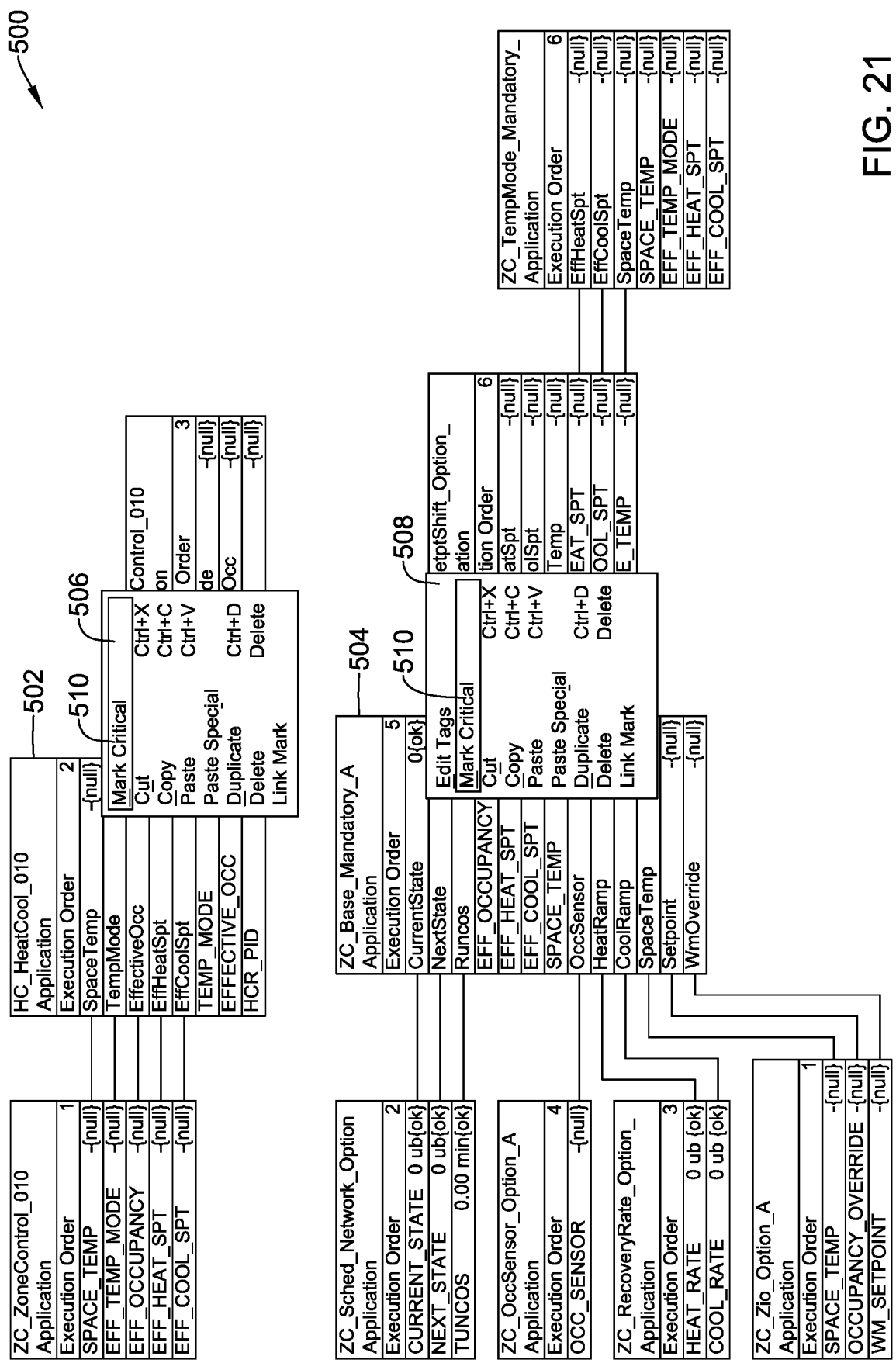
Figure 22:
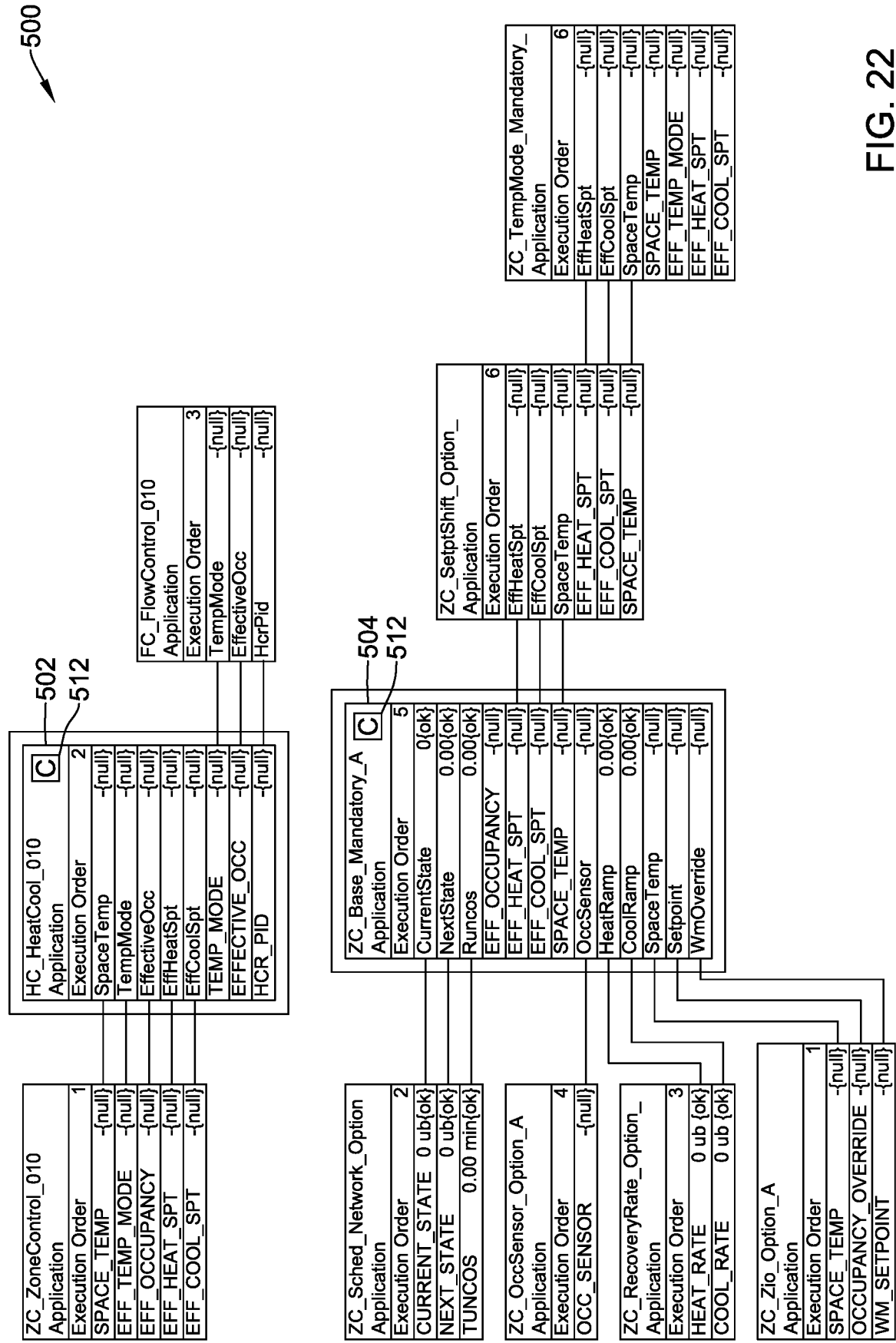

Turning to FIG. 21, it can be seen that the wire screen 500 now includes a pop-up menu 506 that is associated with the function block 502 and a pop-up menu 508 that is associated with the function block 504. While the pop-up menu 506 and pop-up menu 508 are both shown, it is contemplated that these menus would be accesses sequentially. While the pop-up menus 506 and 508 have additional options, what is of interest is that each of the pop-up menus 506 and 508 include an option 510 that allows a user to indicate that that particular function block is to be designated as being critical. Turning to FIG. 22, it can be seen that the wire screen 500 now includes several critical indicators or tags 512 that are now displayed on top of the function block 502 and the function block 504. This provides an easy way to see which function blocks have been tagged as being critical.

Figure 23:
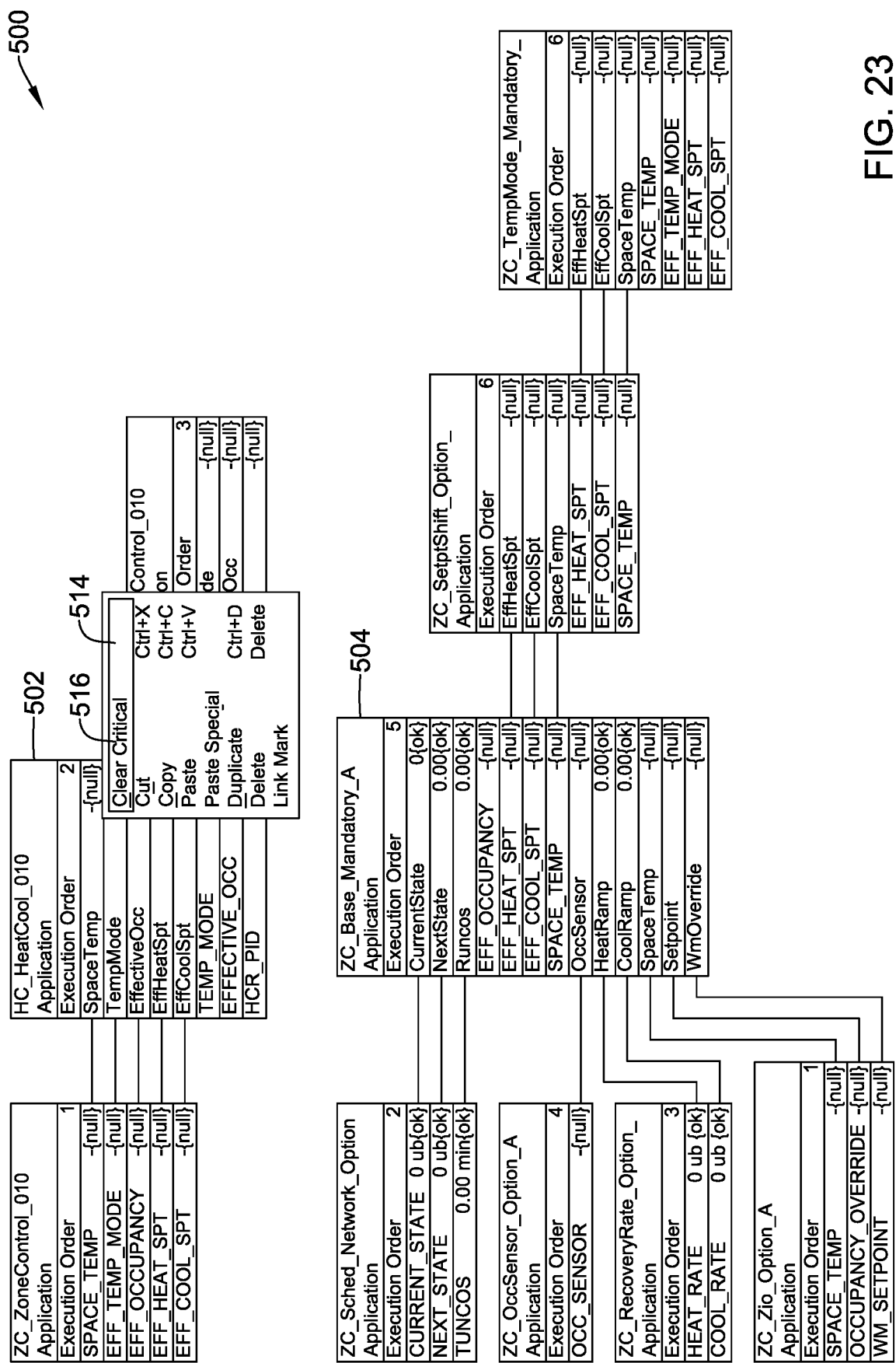

In some cases, a particular function block may be marked as critical in error. In FIG. 23, a portion of the wire screen 500 including the function block 504 is illustrated. It can be seen that there is a pop-up menu 514 hovering over the function block 504. In addition to other options, the pop-up menu 514 includes an option 516 that allows a user to clear or otherwise delete an indication that the particular function block (504 in this case) should not be marked as critical. It will be appreciated that selecting the option 516 will cause the function block 504 to no longer be marked as critical. The function blocks that are marked critical will be downloaded to a corresponding edge controller and the function blocks not marked critical will be implemented by the corresponding virtual controller.

In some cases, the programming tool may be used to simulate executing the function blocks that are critical, and thus disposed within the edge controller, and function blocks that are not critical, and thus disposed within the virtual controller. In some cases, the programming tool may be configured to spawn a new virtual container running the control engine (DDC) embedded in the programming tool to simulate the controller behavior and will have debug points to enable the tool to connect and show the live values. This provides a visual representation of the internal functioning of the control logic, running within each of the virtual controllers. This also permits viewing intermediate values of a function block and to visualize the flow of data from one function block to another, and to hand off from one virtual controller to another.

Figure 24:
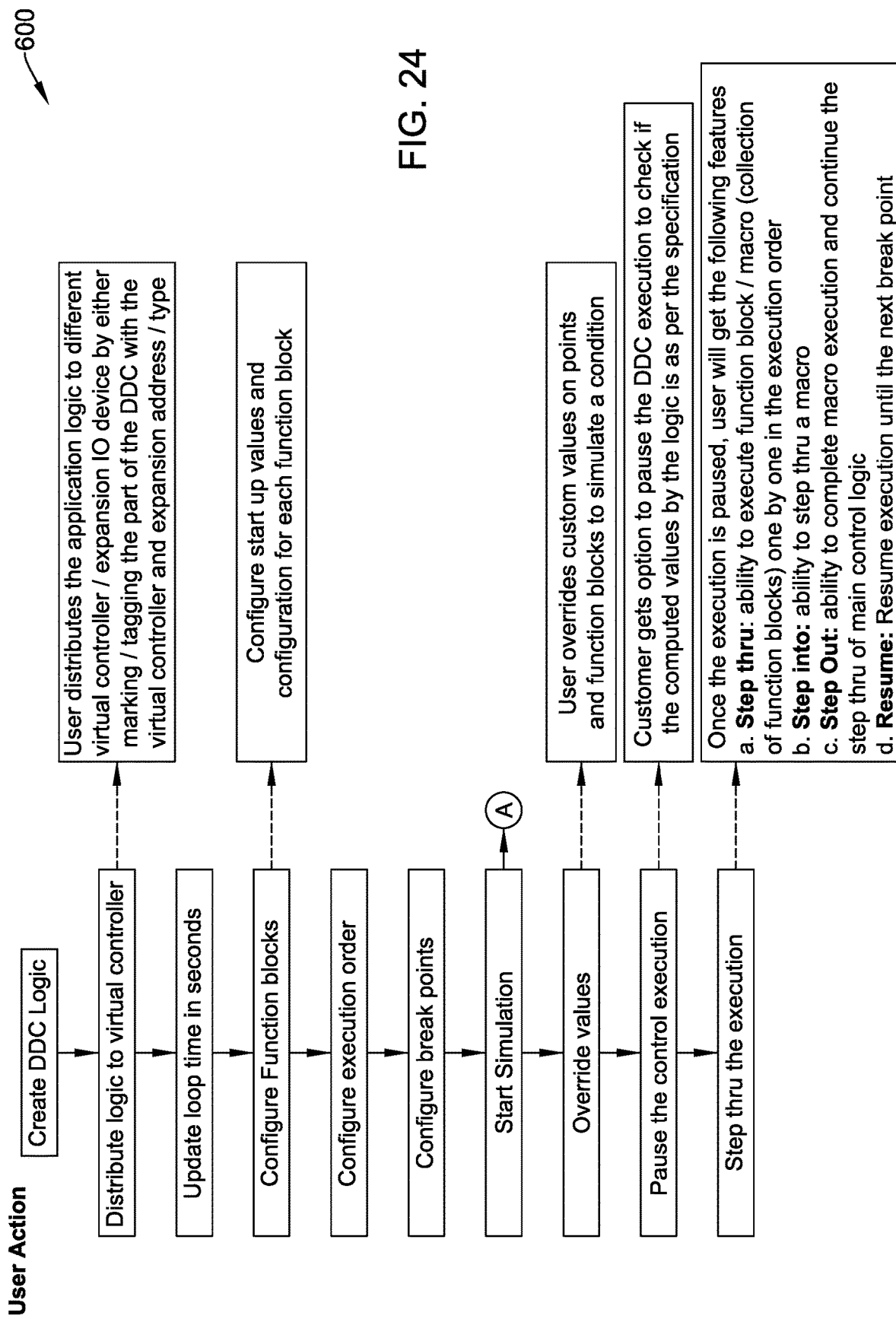
FIG. 24 is a flow diagrams showing use of a programming tool.
Figure 25:
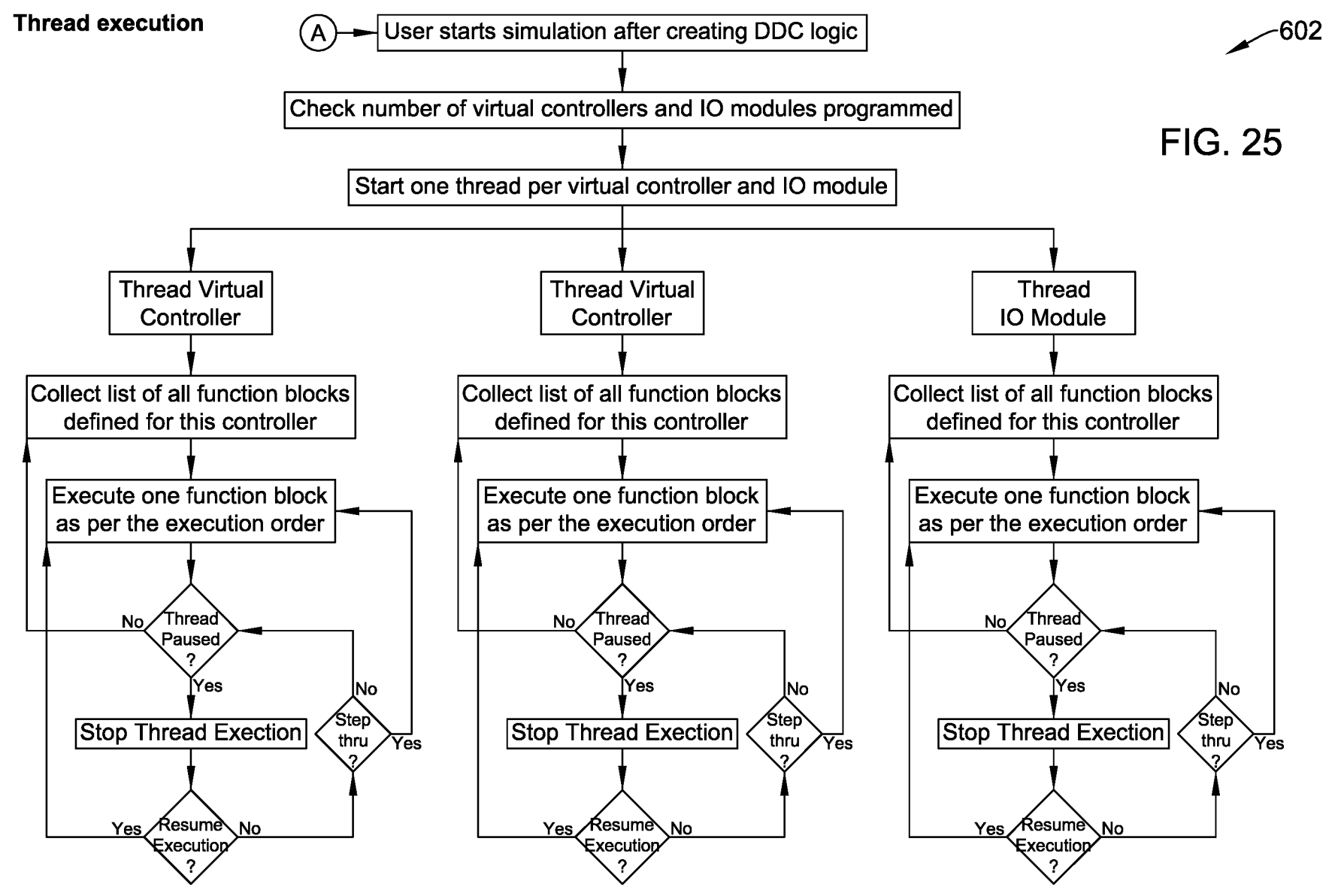
Figure 26:
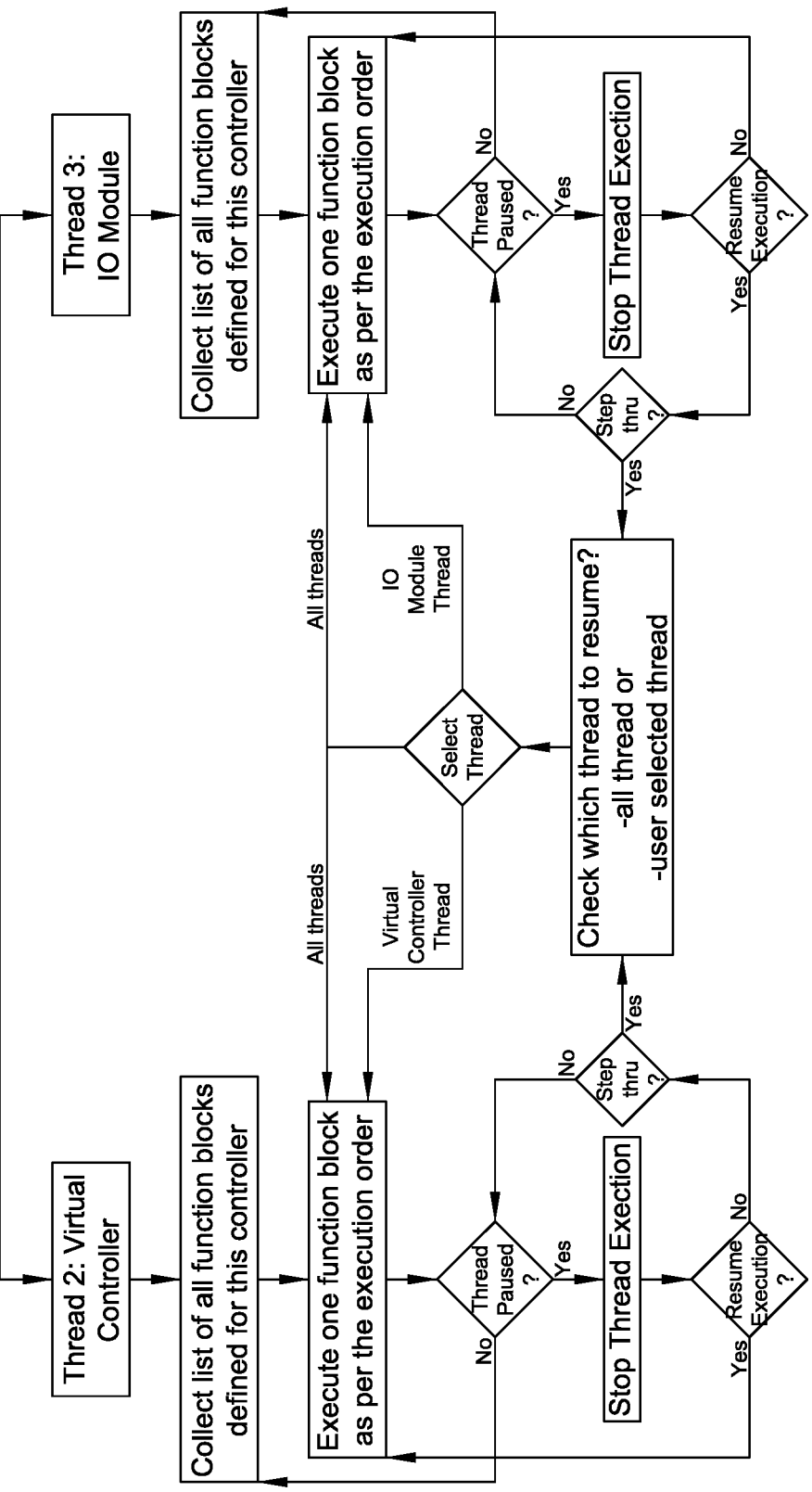
FIG. 26 is a flow diagram showing a pause and step-through thread execution.

The programming tool is configured to implement the function block execution engine as a thread. If the control logic is split across multiple virtual controllers, then the simulation engine will run one thread representing each virtual controller. FIGS. 24-26 provide examples of some of the details within a flow diagram 600, shown in FIG. 24, a flow diagram 602, shown in FIG. 25 and a flow diagram 604, shown in FIG. 26.

While the above disclosure is largely described with respect to a building management system, it is contemplated that the disclosure may be applied to other applications, such as industrial processes control applications and/or any other suitable application. In an industrial process control application, for example, the system may be similar to that shown in FIG. 1 except the building management system components may be replaced with industrial process control components. This is just an example.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A control system for controlling operation of a plurality of building control devices, the control system comprising:
   a pool of virtual controllers hosted on a computing device, each of the virtual controllers in the pool of virtual controllers configured to provide control commands for controlling one or more associate building control devices of the plurality of building control devices over a network;
   a plurality of edge controllers, each of the plurality of edge controllers associated with at least one building control device and configured to receive via the network and execute control commands from one or more of the plurality of virtual controllers of the pool of virtual controllers to control the associated one or more building control devices;
   an orchestrator configured to monitor one or more operational characteristics of each of the plurality of virtual controllers in the pool of virtual controllers hosted on the computing device; and
   the orchestrator further configured to automatically modify one or more aspects of the pool of virtual controllers hosted on the computing device when one or more of the operational characteristics of one or more of the plurality of virtual controllers meets predetermined characteristics.

2. The control system of claim 1, wherein modifying one or more aspects of the pool of virtual controllers comprises assigning additional memory and/or processing resources to one or more of the virtual controllers in pool of virtual controllers.

3. The control system of claim 1, wherein modifying one or more aspects of the pool of virtual controllers comprises assigning less memory and/or processing resources to one or more of the virtual controllers in pool of virtual controllers.

4. The control system of claim 1, wherein modifying one or more aspects of the pool of virtual controllers comprises adding a new virtual controller to pool of virtual controllers and mapping one or more of the plurality of edge controllers to the new virtual controller.

5. The control system of claim 1, wherein modifying one or more aspects of the pool of virtual controllers comprises replacing a virtual controller in the pool of virtual controllers with a new virtual controller and mapping one or more of the plurality of edge controllers that were associated with the replaced virtual controller to the new virtual controller.

6. The control system of claim 5, wherein the new virtual controller includes an updated firmware version or application version relative to the replaced virtual controller.

7. The control system of claim 1, wherein at least one of the plurality of edge controllers is an IO controller that is operatively coupled with the associated at least one building control device.

8. The control system of claim 1, wherein at least one of the plurality of edge controllers is part of the associated at least one building control device.

9. The control system of claim 1, wherein at least one of the plurality of edge controllers is configured to provide one or more parameters to two or more of the of the virtual controllers in the pool of virtual controllers.

10. The control system of claim 9, wherein the one or more parameters include one or more of a sensed condition and an alarm.

11. A control system for controlling operation of a plurality of building control devices, the control system comprising:
    a pool of virtual controllers hosted on a computing device, each of the virtual controllers in the pool of virtual controllers configured to provide control commands for controlling one or more associate building control devices of the plurality of building control devices over a network;
    a plurality of edge controllers, each of the plurality of edge controllers associated with at least one building control device and configured to receive via the network and execute control commands from one or more of the plurality of virtual controllers of the pool of virtual controllers to control the associated one or more building control devices;
    an orchestrator configured to monitor one or more operational characteristics of each of the plurality of virtual controllers in the pool of virtual controllers hosted on the computing device; and
    the orchestrator further configured to automatically replace a virtual controller in the pool of virtual controllers with a new virtual controller and mapping one or more of the plurality of edge controllers that were associated with the replaced virtual controller to the new virtual controller when one or more of the operational characteristics of the replaced virtual controller meets one or more predetermined characteristics.

12. The control system of claim 11, wherein one or more of the predetermined characteristics indicate a non-current firmware version and/or non-current application version, and wherein the new virtual controller includes a current firmware version and/or a current application version.

13. The control system of claim 11, wherein one or more of the predetermined characteristics indicate that the virtual controller is non-functioning.

14. The control system of claim 11, wherein at least one of the plurality of edge controllers is an IO controller that is operatively coupled with the associated at least one building control device.

15. The control system of claim 11, wherein at least one of the plurality of edge controllers is part of the associated at least one building control device.

* * * * *